United States Patent
Takeuchi

(10) Patent No.: US 9,747,231 B2
(45) Date of Patent: Aug. 29, 2017

(54) BUS ACCESS ARBITER AND METHOD OF BUS ARBITRATION

(71) Applicant: Toshiki Takeuchi, Tokyo (JP)

(72) Inventor: Toshiki Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 14/389,410

(22) PCT Filed: Dec. 27, 2012

(86) PCT No.: PCT/JP2012/008347
§ 371 (c)(1),
(2) Date: Sep. 30, 2014

(87) PCT Pub. No.: WO2013/145062
PCT Pub. Date: Oct. 3, 2013

(65) Prior Publication Data
US 2015/0067213 A1    Mar. 5, 2015

(30) Foreign Application Priority Data

Mar. 30, 2012    (JP) ................ 2012-081712

(51) Int. Cl.
*G06F 13/36*    (2006.01)
*G06F 13/40*    (2006.01)
(Continued)

(52) U.S. Cl.
CPC ........ *G06F 13/362* (2013.01); *G06F 13/4068* (2013.01)

(58) Field of Classification Search
CPC ........ G06F 13/362; G06F 13/40; G06F 13/14; G06F 13/36
See application file for complete search history.

(56) References Cited

U.S. PATENT DOCUMENTS

2006/0155904 A1* 7/2006 Murakami .......... G06F 13/1663
                                                   710/240
2007/0016709 A1* 1/2007 Kazama ................ G06F 13/364
                                                   710/113

FOREIGN PATENT DOCUMENTS

JP      02-064839      3/1990
JP      05-289987      11/1993
(Continued)

OTHER PUBLICATIONS

International Search Report mailed Apr. 2, 2013 in corresponding PCT International Application.
(Continued)

*Primary Examiner* — Henry Tsai
*Assistant Examiner* — Christopher A Daley
(74) *Attorney, Agent, or Firm* — Finnegan, Henderson, Farabow, Garrett & Dunner, L.L.P.

(57) ABSTRACT

A bus access arbiter includes an access mode judgment unit and a round robin arbitration unit. The access mode judgment unit judges, when bus access is generated from a plurality of masters M0 and M1, whether an access mode of each of the masters that are connected is a sequential access mode or a single access mode. The round robin arbitration unit dynamically switches an access arbitration method for arbitrating the bus access according to the access mode. The access mode judgment unit includes an access interval count unit, a sequential access number count unit, and an access mode state register that stores a state of the judged access mode for each of the masters, and updates the state of the access mode based on an access interval and the number of sequential access.

9 Claims, 14 Drawing Sheets

(51) Int. Cl.
  *G06F 13/362*  (2006.01)
  *G06F 13/14*  (2006.01)

(56) References Cited

FOREIGN PATENT DOCUMENTS

| | | |
|---|---|---|
| JP | 09-128325 | 5/1997 |
| JP | 2001-216256 | 8/2001 |
| JP | 2005-235197 | 9/2005 |
| JP | 2006-221611 | 8/2006 |
| JP | 2007-26021 | 2/2007 |
| JP | 2008-135068 | 6/2008 |
| JP | 2008-293487 | 12/2008 |
| JP | 2011-123913 | 6/2011 |
| WO | WO0122233 | * 3/2001 |

OTHER PUBLICATIONS

Notification of Reasons for Refusal mailed Jun. 28, 2016, by the Japanese Patent Office in counterpart Japanese Patent Application No. 2014-507040.

* cited by examiner

BUS ACCESS ARBITER AND METHOD OF BUS ARBITRATION

CROSS-REFERENCE TO RELATED PATENT APPLICATIONS

This application is a National Stage Entry of International Application No. PCT/JP2012/008347, filed Dec. 27, 2012, which claims priority from Japanese Patent Application No. 2012-081712, filed Mar. 30, 2012. The entire contents of the above-referenced applications are expressly incorporated herein by reference.

TECHNICAL FIELD

The present invention relates to an improvement of a bus access arbiter for a multiprocessor system. In particular, the present invention relates to a bus access control technique that is capable of efficiently realizing sequential stream data transfer in wireless signal processing and the like.

BACKGROUND ART

In wireless communication processing and the like, generally a multi-processor system that performs various processing in parallel using a plurality of cores is used. A bus is used for access, for example, between the respective cores and between the cores and a memory. In this bus access, when there is an access conflict between a plurality of masters for simultaneous access on a certain bus, an access arbiter for arbitrating the conflicting bus access is required.

In regard to an access arbiter related to the present invention, as an access arbitration method for realizing the access arbiter, the "round robin method" and "fixed priority method" have mainly been used. The "round robin method" is a method that does not take priorities into account in particular and sequentially provides each of the masters with an access privilege with an equal probability. The access arbiter is realized with a circuit configuration that has, for example, states for each of the connected masters and sees whether or not there is an access command in an ascending order.

Meanwhile, the "fixed priority method" is a method that provides the access privilege to the master having the highest priority when access commands conflict. The "fixed priority method" is characterized in that the circuit configuration is simple because the priorities are fixed and states are not included in particular. However, in the case of the "fixed priority method", when there is a possibility that the master having a high priority performs sequential access, the other masters are not provided with the access privilege at all in a period while the master with the high access privilege performs sequential access. Therefore, there is a significant problem that the number of worst cycles cannot be estimated, and thus the performance cannot be guaranteed. Accordingly, generally the "round robin method" is used more often than the "fixed priority method", however the "round robin method" has a problem that the priorities cannot be taken into account.

Further, in recent years, there is a high-speed on-chip bus interface capable of stream access. This bus interface standard supports split transfer (pipeline transfer) of an address and data at the time of reading in order to increase the speed of access. This bus interface standard is, for example, OCP (Open Core Protocol) or AXI (Advanced eXtensible Interface). By using such a bus interface standard that is capable of split transfer in which a request phase (address) and a response phase (data) are separated, it is possible to sequentially issue read addresses without depending on data latency at the time of reading. Accordingly, with an increase in the size of a system and an improvement of the speed of operating clock frequencies, even when the number of latency cycles at the time of reading increases, it is possible to perform stream access at a high transfer throughput by using a bus capable of split transfer.

Further, in recent years, with an increase in the size of the system, a bus configuration often used is a hierarchical bus configuration in which a bus is divided into several sections, a plurality of bus interfaces are combined, and connections are made in stages.

As a technique related to the present invention, there is, for example, a technique disclosed in Patent Literature 1. Patent Literature 1 suggests a bus system technique for coupling a plurality of masters to a bus based on the Open Core Protocol (OCP). In addition to a bus arbiter circuit for arbitrating access from a plurality of masters, this bus system technique further includes an FIFO buffer circuit for sequentially storing access master information at the time of reading so as to enable the split transfer, which is a feature of the OCP. In this way, even with a bus capable of split transfer, read data can be returned to a desired master using the master information stored to FIFO at the time of returning the read data to the master. Thus, this bus system technique has a benefit that it is capable of performing sequential transfer while arbitrating read access from a plurality of masters.

As another technique related to the present invention, there is a technique disclosed in Patent Literature 2. Patent Literature 2 suggests a bus control technique when the bus interface standard capable of split transfer is used as a hierarchical bus. This bus control technique performs, in parallel to cache snoop processing of a preceding stage, access arbitration processing of a subsequent stage early at the time of accessing the hierarchical bus in the preceding stage and the subsequent stage, to thereby realize an improvement of the speed of bus access.

However, as mentioned in Patent Literature 3, which is another related technique, in a bus interface capable of split transfer, there is a problem that when latency (the number of return cycles) of read data differs according to an access destination (slave), bus access to different access destinations (slaves) cannot be sequentially transferred eventually.

In particular, in the hierarchical bus configuration using the bus interface capable of split transfer, when the access arbitration is performed by the "round-robin method" that provides access privileges to a plurality of masters in the preceding stage with an equal probability, for example, when a master A issues read access to a slave 1 and a master B issues read access to a slave 2 sequentially, the masters A and B are provided with access privileges alternately according to the round robin method, and on the bus of the subsequent bus, there will be alternate read access to different slaves, which are the slaves 1 and 2.

In this case, there is a problem that, in order to prevent conflict of read data on the bus of the subsequent stage and Out-Of-Order transfer, the read access to different access destinations (slaves) cannot be transferred sequentially, and Wait is generated in each access, thereby deteriorating the transfer throughput. However, in the case where the bus interface standard supports "burst transfer", and further, each of the masters can explicitly specify "burst" using a dedicated signal, if the access arbitration is performed per "burst transfer" on the bus of the preceding stage, constant and sequential access is ensured in the subsequent stage, thereby preventing deterioration of the transfer throughput.

However, in wireless communication processing that uses the multi-processor system of the present invention, sequential access, in which a master side cannot explicitly specify burst (addresses are non-sequential) such as interleave processing for rearranging data, frequently occurs. Therefore, there is a problem that the "burst transfer" cannot be used. Further, when the bus interface supports the "burst transfer", there is a problem that the circuit configuration associated with the bus becomes complicated.

Moreover, as another related technique for solving the above-mentioned problems, there is a technique disclosed in Patent Literature 4. Patent Literature 4 suggests a technique for limiting the number of sequential execution in a transfer phase for a plurality of access requests to N. This technique is to limit, for example, the number of sequential execution of a master having a high priority, and provide an access privilege to a master having a low priority with a constant probability, so as to guarantee the number of access cycles in a worst case and equalize access performance of the masters as much as possible.

However, this access arbitration method is effective when each master often performs sequential access, like in a cache, however when single access and sequential access is mixed according to the processing, it is necessary to keep the master wait for a predetermined period to determine whether or not the state of the master is the sequential access, even if the states of the masters are the single access. Therefore, there is a problem that the access performance deteriorates more than in a common round robin method.

Note that as another technique related to the present invention, there are techniques disclosed in Patent Literatures 5 to 7. However, Patent Literature 5 only discloses a method for "judging whether or not to continue sequential access based on a judgment result in the case of round robin arbitration" and does not disclose a configuration of "dynamically performing an access mode judgment in advance and dynamically switching an access arbitration mode for each master whether or not to perform round robin arbitration based on the judgment result".

Further, there is a problem in the technique disclosed in Patent Literature 5 that it requires a signal for access arbitration to be output for each access from the master side, thereby generating an overhead. Another problem is that, in a manner similar to the above-mentioned Patent Literature 4, when single access for control and sequential access for data processing is generated at a certain frequency from each master core, access arbitration cannot be carried out efficiently (because the access mode judgment is not performed in advance).

Patent Literature 6 discloses a method of "switching between a determining mode that has a bus ownership for a fixed period of time and an adaptive mode capable of round robin allocation". However, in Patent Literature 6, it is necessary to "statically set the mode from outside using a mode setting parameter", and it is not possible to "dynamically switch the access mode itself based on the judgment result".

Furthermore, there is a problem in the technique disclosed in Patent Literature 6 that there is an overhead in which mode setting is required as appropriate. Moreover, at the time of actual usage, when single access for control and sequential access for data processing is generated at a certain frequency from each master core or when each master core is multi-tasking, there is a problem that it is difficult to set the mode efficiently in advance.

Additionally, in a manner similar to Patent Literature 5, Patent Literature 7 does not to disclose a configuration of "judging an access mode in advance and dynamically switching the access mode afterward".

CITATION LIST

Patent Literature

Patent Literature 1: Japanese Unexamined Patent Application Publication No. 2005-235197
Patent Literature 2: Japanese Unexamined Patent Application Publication No. 09-128325
Patent Literature 3: Japanese Unexamined Patent Application Publication No. 02-064839
Patent Literature 4: Japanese Unexamined Patent Application Publication No. 2008-293487
Patent Literature 5: Japanese Unexamined Patent Application Publication No. 2001-216256
Patent Literature 6: Japanese Unexamined Patent Application Publication No. 2008-135068
Patent Literature 7: Japanese Unexamined Patent Application Publication No. 2011-123913

SUMMARY OF INVENTION

Technical Problem

As described above, there is a problem that when a hierarchical bus configuration using a bus interface capable of stream access is employed in a bus access arbiter for a multi-processor system, if access arbitration is performed according to the "round robin method" or the like, an access throughput deteriorates.

In particular, when single access for control processing and sequential access (stream access) for data processing in which a master side cannot explicitly specify burst (addresses are non-sequential) is mixed, which frequently occurs in wireless communication processing and the like, there is a problem that access arbitration cannot be performed efficiently.

The reason is that when the master A issues read access to the slave 1 and the master B issues read access to the slave 2 sequentially, and the masters A and B are provided with access privileges alternately according to the round robin method in the preceding stage, read access is made to the slaves 1 and 2 alternately in the subsequent stage. In this case, in order to prevent conflict of read data on the bus of the subsequent stage and Out-Of-Order transfer, the read access to different access destinations (slaves) cannot be transferred sequentially, and Wait is generated in each access, thereby deteriorating the transfer throughput.

Meanwhile, as described above, there is a significant problem that although it is possible to sequentially transfer data when the "fixed priority method" is used, it is not possible to guarantee the number of access cycles in a worst case. Moreover, as disclosed in Patent Literature 4, there is a problem that when the access arbitration method for providing an access privilege every predetermined period assuming the sequential access is used, the access performance deteriorates in a period when single access frequently occurs.

The present invention is made to solve such problems, and an object of the present invention is to provide an access arbiter and a bus access arbitration method in which a transfer throughput will not deteriorate and that are capable of guaranteeing cycles in a worst case, when, for example, a hierarchical bus configuration using a bus interface capable of stream access is employed as a bus access arbiter of a multi-processor system and single access for control and sequential access for data processing is generated at a certain frequency from each master core.

Solution to Problem

A bus access arbiter according to the present invention includes: access mode judgment unit for judging, when bus access is generated from a plurality of masters, whether an access mode of each of the masters that are connected is a sequential access mode or a single access mode; and a round robin arbitration unit for dynamically switching an access arbitration method that arbitrates the bus access according to the access mode, in which the access mode judgment unit includes: access interval count unit for counting an access interval from the master; sequential access number count unit for counting the number of sequential access from the master; and an access mode state register for storing a state of the judged access mode for each of the masters, and the bus access arbiter updates the state of the access mode based on the access interval and the number of sequential access.

Another bus access arbiter according to the present invention includes: sequential access number judgment unit for counting, when bus access is generated from a plurality of masters, the number of sequential access from the last master that has been provided with an access privilege; and round robin arbitration unit for dynamically switching an access arbitration method that arbitrates the bus access according to a judgment result by the sequential access number judgment unit, in which the round robin arbitration unit (a) when access is generated from the master while the number of sequential access is within a predetermined number of sequential access, preferentially provides an access privilege to the said mater, and (b) when the number of sequential access exceeds the predetermined number of sequential access or no access is generated from the master, access arbitration is performed according to a round robin method.

A bus access arbitration method according to the present invention includes: an access mode judgment step for judging, when bus access is generated from a plurality of masters, whether an access mode of each of the master that are connected is a sequential access mode or a single access mode; and a round robin arbitration step for dynamically switching an access arbitration method that arbitrates the bus access according to the judged access mode, wherein in the access mode judgment step, a state of the access mode is updated based on an access interval from the master and the number of sequential access from the master, and the state of the updated access mode is stored to an access mode state register for each of the masters.

Advantageous Effects of Invention

According to the present invention, it is possible to provide a bus access arbiter and a bus access arbitration method in which a transfer throughput will not deteriorate and that are capable of guaranteeing cycles in a worst case.

DESCRIPTION OF EMBODIMENTS

Figure 1:
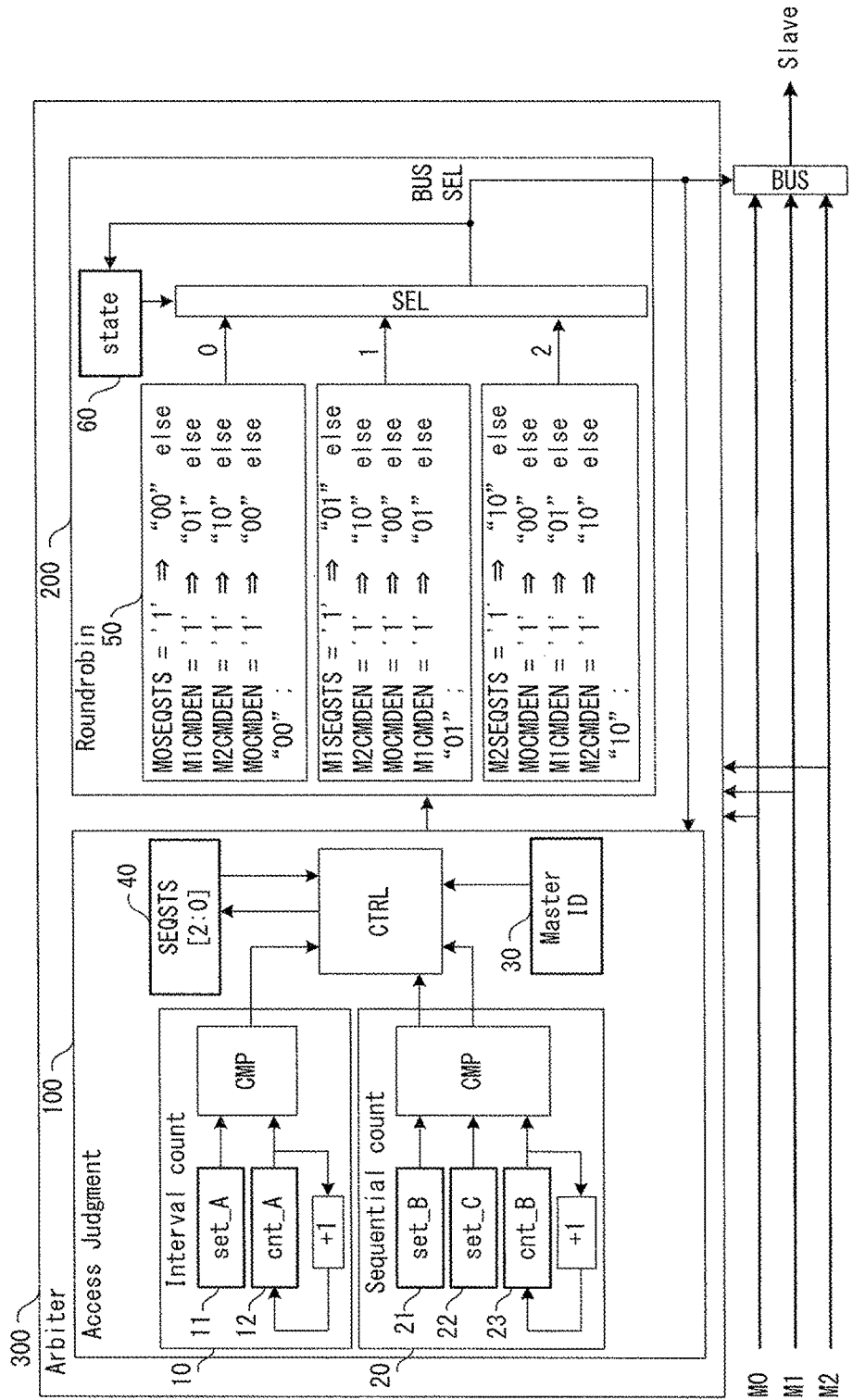
FIG. 1 is an entire block diagram of a bus access arbiter according to a first exemplary embodiment.

Hereinafter, the present invention shall be explained with reference to FIGS. 1 to 14. The same elements are denoted by the same reference numerals throughout the drawings, and a repeated explanation shall be omitted as necessary for clarity of the explanation.

Hereinafter, firstly a first exemplary embodiment shall be explained with reference to FIGS. 1 to 8. In the first exemplary embodiment, as a bus access arbiter in a multi-processor system, a basic configuration, features, and an operation of the bus access arbiter shall be explained in detail. Next, a second exemplary embodiment shall be explained with reference to FIGS. 9 to 11. The second exemplary embodiment explains in detail a case in which an access mode judgment unit is included for each connected master to thereby enable a judgment whether or not the master is in a sequential access mode or a single access mode more optimally. Next, a third exemplary embodiment shall be explained with reference to FIGS. 12 and 13. A third exemplary embodiment explains in detail a case in which an access interval for judging the access as being the sequential access is limited to one cycle (no interval) to thereby simplify the circuit. Lastly, a fourth exemplary embodiment shall be explained with reference to FIG. 14. The fourth exemplary embodiment explains a case when the round robin method with priorities is implemented as the basic access arbitration method instead of the common round robin method and a case of dynamically updating the number of access interval cycles for performing the access mode judgment and the number of sequential access.

First Exemplary Embodiment of the Invention (Explanation of Configuration)

FIG. 1 is a diagram showing an entire configuration of a bus access arbiter in regard to an example of a bus access arbiter in a multi-processor system according to this exemplary embodiment. A bus access arbiter 300 according to this exemplary embodiment is mainly configured to include an access mode judgment unit 100 that judges whether or not each master (M0, M1, and M2) is in a sequential access mode and a round robin arbitration unit 200 that can dynamically change the access arbitration method according to the access mode.

The access mode judgment unit 100 includes an access interval count unit 10 that counts "A" to judge whether or not access from each master is sequential access for "B" or greater times within "A" cycles, a sequential access number count unit 20 that counts "B", and a master ID register 30 that stores a master ID to indicate a master on which access mode judgment is currently performed. Further, the access mode judgment unit 100 includes an access mode state register 40 that stores a state of the judged access mode for each master.

The access interval count unit 10 includes an access interval setting register 11 that sets the number of access intervals "A" and an access interval counter 12. The sequential access number count unit 20 may include a sequential access number setting register 21 for judgment that sets the sequential access number "B" for judgment, a maximum sequential access number setting register 22 for setting the maximum number of sequential access "C" for arbitration, and a sequential access number counter 23.

The round robin arbitration unit 200 includes a round robin control circuit 50 that is supplied with an access mode state signal from each master and switches the access arbitration method based on the access mode and a round robin state register 60 that stores a last master ID provided with an access privilege as a reference of round robin.

(Explanation of Operation)

Figure 2:
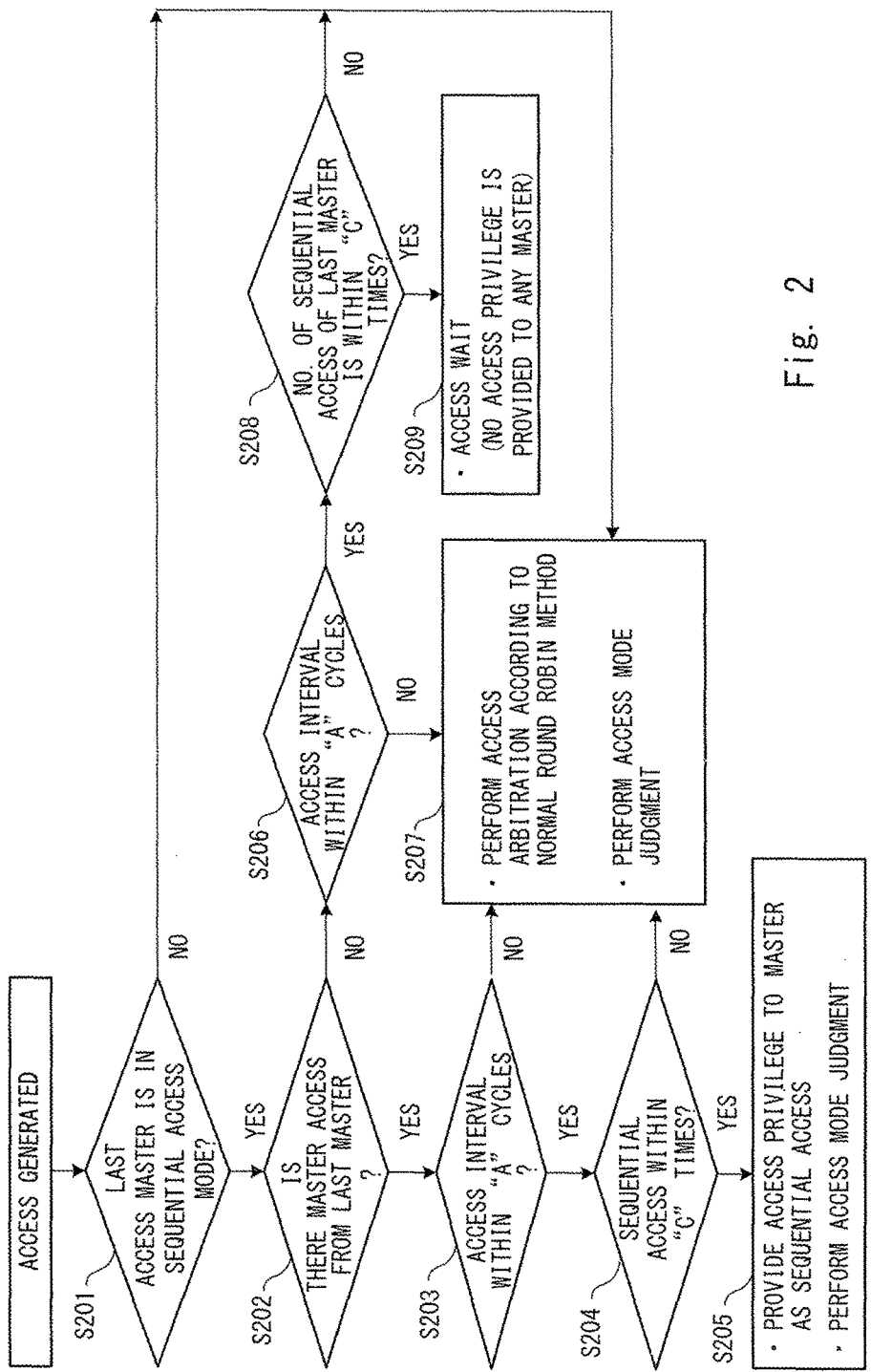
FIG. 2 is a flowchart showing access arbitration processing in the bus access arbiter according to the first exemplary embodiment.
Figure 3:
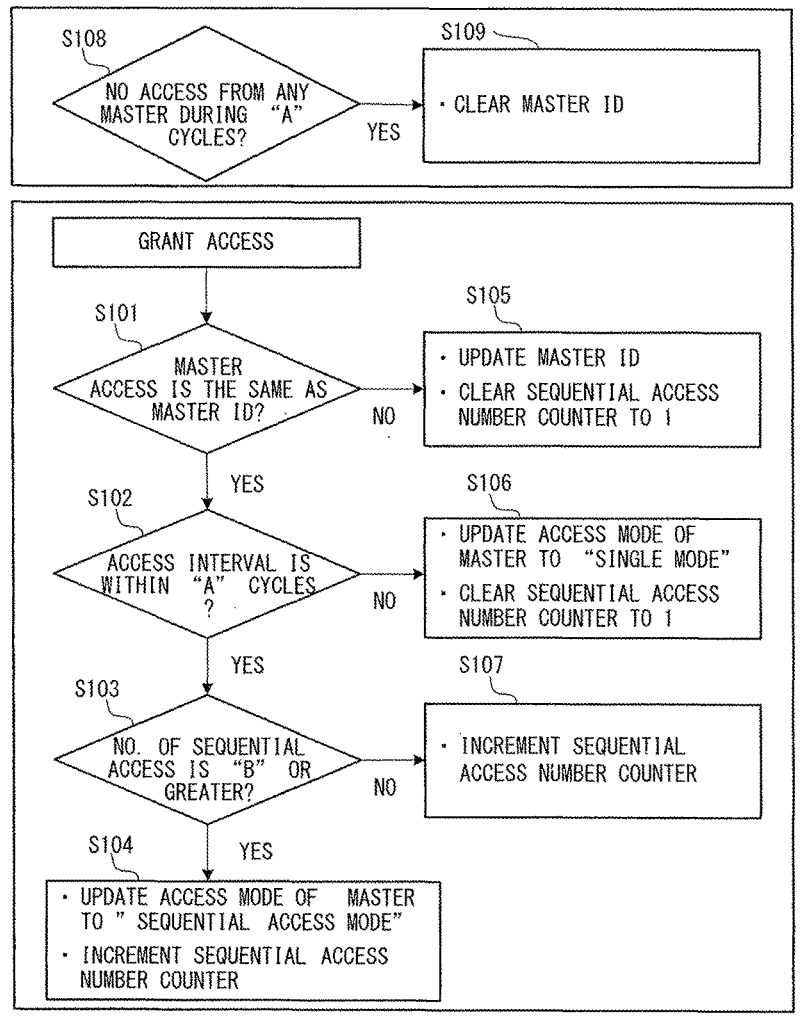
FIG. 3 is a flowchart showing access arbitration processing in the bus access arbiter according to the first exemplary embodiment.

An operation of this exemplary embodiment shall be explained with reference to FIGS. 1 to 5. FIGS. 2 and 3 are flowcharts showing access arbitration processing in the bus access arbiter 300 shown in FIG. 1. The access arbitration processing according to this exemplary embodiment is mainly configured to include two processing steps, which are an access arbitration step shown in FIG. 2 and an access mode judgment step shown in FIG. 3.

The bus access arbiter 300 performs the access arbitration step according to the current access mode state of each master (a value of the access mode state register 40) when certain access is generated from any of the connected masters, and at the same time, performs the access mode judgment step as necessary so as to update the access mode state of the said master.

That is, in the access arbitration step, the bus access arbiter 300 refers to the current master ID register 30 and the value of the access mode state register 40 inside the access mode judgment unit 100, outputs a switch signal of the access arbitration method using the access interval count unit 10 and the sequential access number count unit 20, and switches an operation mode of the round robin arbitration unit 200, thereby performing access arbitration.

Further, in the access mode judgment step, to the master provided with an access privilege using the round robin arbitration unit 200 in the access arbitration step, the access mode state register 40 is updated using the access interval count unit 10 and the sequential access number count unit 20 inside the access mode judgment unit 100.

The access arbitration step shall be explained in detail with reference to FIG. 2.

In the access arbitration step, when certain access is generated from any of the masters connected to the said bus, (S201) the access mode state of the last access master that is provided with the access privilege is confirmed according to the round robin method or the like.

When the access mode state of the last access master is the "sequential access mode" in (S201), an existence of access from the last master is confirmed in (S202). Then, it is characterized in that if access is sequentially generated from the master that is in the "sequential access mode", and (S203) when the access interval is within "A" cycles and (S204) the number of sequential access is within "C", (S205) access privileges are sequentially provided to the said master as sequential access.

On the other hand, (S201) when the access mode of the last master is the "single access mode" (i.e., the access mode is not the "sequential access mode"), (S207) access arbitration is performed according to the common round robin method, and an access privilege is provided to any of the masters that generate access. Moreover, in the case of the access from the master that is in the "sequential access mode" state, (S203) when the access interval exceeds "A" cycles or (S204) the number of sequential access is already "C" or greater, (S207) the access arbitration is performed according to the common round robin method.

Meanwhile, (S202) when access is not generated from the last access master, that is in the "sequential access mode" and access is generated from other masters, (S206) the access interval is within "A" cycles, and further, (S208) the number of sequential access of the last access master is within "C", (S209) the said access is made to wait in consideration of a possibility that sequential access is generated from the last access master that is in the process of sequential access.

However, (S206) when the access interval exceeds "A" cycles or (S208) the number of sequential access of the last access master exceeds "C", the sequential access state is canceled. Thus, (S207) an access privilege is provided to the said master according to the common round robin method.

In (S205) or (S207) of the access arbitration step, when an access privilege is provided and access is granted to any of the masters, the access mode judgment step shown in FIG. 3 is performed.

In the access mode judgment step, firstly (S101) the granted access is judged whether or not it is from a master having a master ID on which the access mode judgment is currently performed. When the access is from the master that has the same master ID as that of the master granted access, and (S102) while the access interval is within "A" cycles, (S103) the number of sequential access reaches "B" or greater, (S104) the access mode state of the said master is updated to the "sequential access mode", and the sequential access number counter 23 is incremented.

(S102) When the access interval exceeds "A" cycles, the access is not regarded as the sequential access, and (S106) the access mode state of the said master is updated to the "single access mode". At the same time, the sequential access number counter 23 is cleared to one.

Meanwhile, (S102) when the access interval is within "A" cycles, (S103) but the number of sequential access is still less than "B", (S107) the access mode state of the said master is not updated, and only the sequential access number counter 23 is incremented.

Further, in S101, when the access is from a master that has a master ID different from the master that is granted access (S105), the value of the master ID register 30 is updated to the said master, and the sequential access number counter 23 is cleared to one. At this time, although not shown in (S105), when the number of sequential access of the master ID side on which the access mode judgment has been performed is less than "B", the access mode of the said master ID is updated to the "single access mode".

Note that as a static operation for the access arbitration step, (S108) when there is no access from any of the masters during "A" cycles, it is regarded that there is no master on which the access mode judgment is currently performed, and (S109) the value of the master ID register 30 is cleared.

Next, a relationship between each element circuit inside the bus access arbiter 300 in FIG. 1 and an access arbitration process flow of FIGS. 2 and 3 shall be explained. The access interval count unit 10 inside the access mode judgment unit 100 is used in (S203) and (S206) of the access arbitration step and (S102) and (S108) of the access mode judgment step.

The sequential access number count unit 20 is used in (S204), (S208), and (S103). However, as the sequential access number setting registers 21 and 22 in (S204) and (S208) are different from those in (S103), which will be compared, this requires attention. This is because that as for the access mode judgment, the access is judged as being the sequential access mode by the minimum number of sequential access "B", while as for the access arbitration, "C" that is a value greater than "B" is used as a reference of a maximum value for sequential access to realize an optimum throughput as a whole.

The access mode state register 40 of each master, which relates to a feature of this exemplary embodiment, is used to switch the access arbitration mode in (S201) of the access arbitration step, and the access mode state is updated in (S104) and (S106) of the access mode judgment step.

The master ID register 30 is used and updated in (S101), (S105), or (S109) of the access mode judgment step. Further, the round robin control circuit 50 inside the round robin arbitration unit 200 is used in (S205) and (S207) of the access arbitration step and switches the access arbitration method based on the access mode state and the like of each master. The round robin state register 60 is used in (S202), (S205), and (S207).

(Explanation of Access Arbitration Processing Timing)

Figure 4:
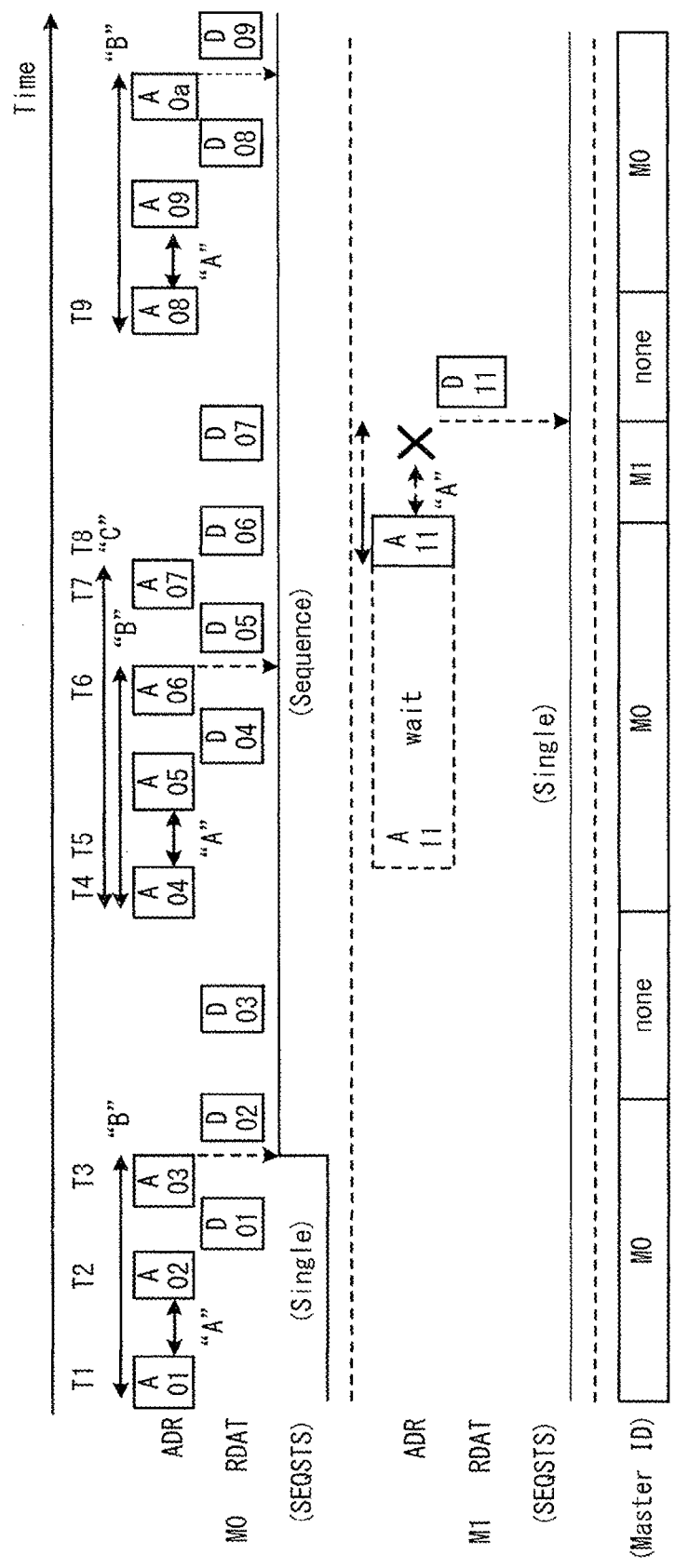
FIG. 4 is a timing chart showing access arbitration processing in the bus access arbiter according to the first exemplary embodiment.
Figure 5:
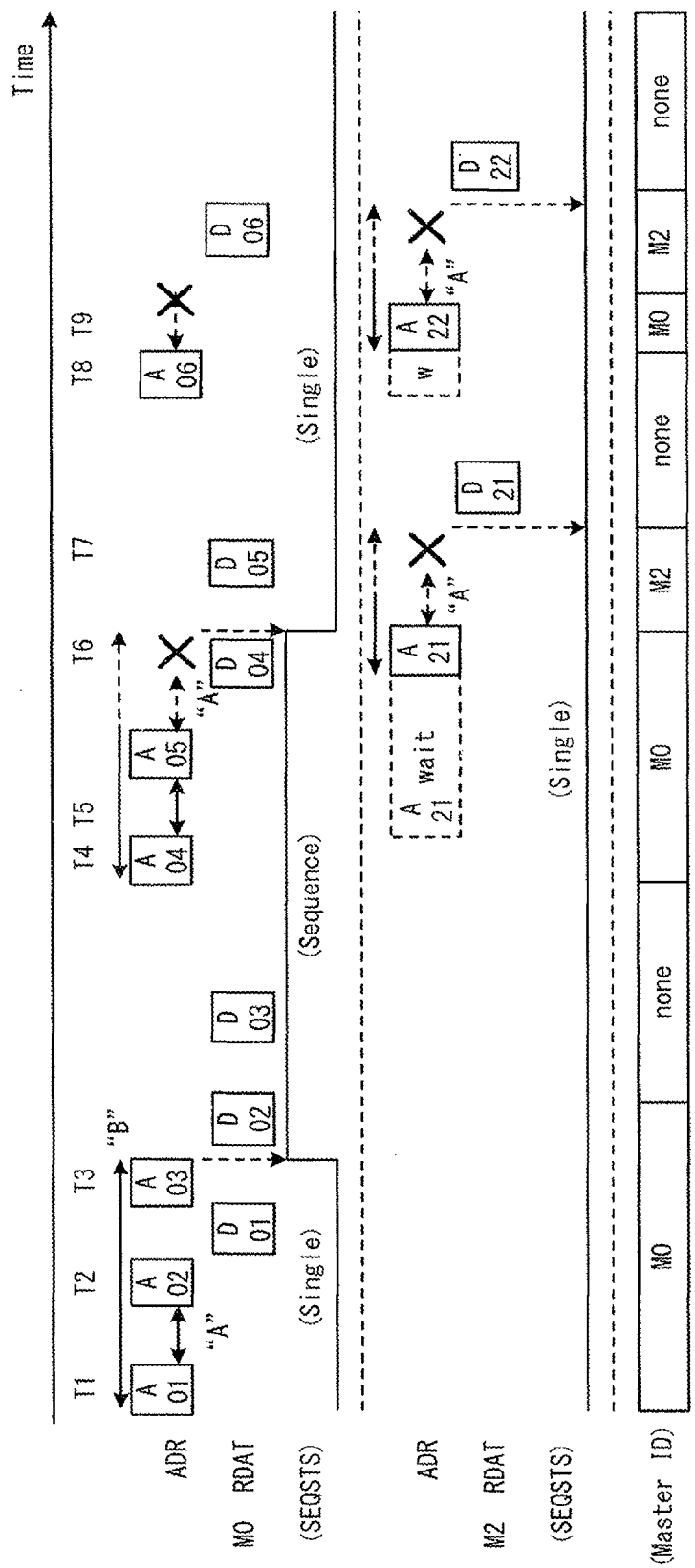
FIG. 5 is a timing chart showing access arbitration processing in the bus access arbiter according to the first exemplary embodiment.

FIGS. 4 and 5 are timing charts showing an example of the access arbitration processing in the bus access arbiter 300 shown in FIG. 1. FIG. 4 shows an example of processing timings when the master M0 is in the sequential access mode. FIG. 5 shows an example of processing timings when the master M0 is being switched between the sequential access mode and the single access mode.

In FIGS. 4 and 5, ADR indicates a transaction of a signal (e.g., an address signal, a command signal, a write data signal, and an accept signal) on a request phase side in the bus interface capable of split transfer, while RDAT indicates a signal (a read data signal, a response signal and the like) on a response phase side. Further, SEQSTS indicates the access mode state of each master, while Mater ID indicates the master ID 30 on which the access mode judgment is currently performed.

As illustrated in FIG. 4, from time T1 to T3, the access mode judgment is performed on the master M0 which has been granted access, and when sequential access is generated "B" or greater times while the access interval is within "A" cycles, the master M0 will be in the sequential access mode state (SEQSTS=Sequence).

Then, at the time T4, the master M0 is granted access. When there is an access request from the master M1 at the time T5, in (S209) of the access arbitration step, if the last access master M0 is in the "sequential access mode", and further, the number of sequential access is within "C" while the access interval is within "A" cycles, the said access is made to wait.

However, at a timing of the time T8, as the above-mentioned number of sequential access exceeds "C", (S208) of the access arbitration step will be No, and the arbitration is performed according to the common round robin method. As a result, at the time T8, an access privilege is provided to the access request from the master M1.

That is, as the "sequential access" from any of the masters is possible up to "C" times of the sequential access while the access interval is within "A" cycles, a high transfer throughput can be realized. Moreover, as the access interval "A" cycles×the number of sequential access "C" will be the upper limit of the said sequential access, it is possible to guarantee the worst number of access cycles in a worst case of other masters.

Further, as illustrated in FIG. 5, FIG. 5 is almost the same as FIG. 4 until the time T5, however when the access interval exceeds "A" cycles at the time T6, the sequential access mode judgment from the master M0 ends.

In this case, in the access arbitration step, (S206) as the access interval is no longer within "A" cycles, the access arbitration is changed to the one according to the common round robin method, and an access privilege is provided to the access from the master M2 which has been waiting. Further, in (S105) of the access mode judgment step, the master ID on which the access mode judgment will be performed is updated to the master M2, and the access mode judgment on the master M2 is started.

Meanwhile, as the number of sequential access is less than "B", the value of the access mode state register 40 for the master M0 is updated to the "single access mode" (SEQSTS=Single). Then, when access is generated from the master M2 again at the time T9, when the state of the last master M0 that is provided with an access privilege at the time T8 is the "single access mode", the access arbitration processing is performed according to the common round robin method instead of the access arbitration method in consideration of the sequential access mode.

That is, as the state of the master M0 is the "single access mode", there is a low probability that the sequential access is generated next. Therefore, it is not necessary to wait in consideration of the sequential access from the master M0, and an access privilege is immediately provided to bus access from the master M2. That is, in this exemplary embodiment, the access mode function, which is the single access mode, is included, thereby preventing insertion of extra wait in consideration of sequential access and thus enabling efficient access transfer.

Note that although not shown in the drawings, the access interval setting register 11, the sequential access number setting register 21 for judgment, and the maximum sequential access number setting register 22, which are setting registers, can be set externally, and by changing the values of those registers, it is possible to realize flexible access arbitration processing. Moreover, there is no problem to have a configuration in which the value of the access mode state register 40 is set externally, and the access arbitration processing is performed using the set access mode regardless of the access mode judgment result.

(Explanation of Specific Configuration)

FIG. 1 is a block diagram showing a specific example in which the bus access arbiter 300 according to this exemplary embodiment is incorporated into a multi-processor system 500 that performs wireless signal processing and the like.

The multi-processor system 500 includes a plurality of arithmetic processing clusters 400 and 401 and the like that are clustered as processing engine blocks. Each of the arithmetic processing clusters 400 and 401 is configured to include a plurality of masters M0, M1 . . . Mn, which are arithmetic processing processors (IP cores) 80, 81 . . . 8n, and a plurality of slaves 90, 91 . . . 9k, which are shared memories S0, S1 . . . Sk for data transfer between the respective masters.

Further, the respective masters and slaves are connected using buses 70 and 71 that are capable of performing a split arithmetic operation. Then, the arithmetic processing clusters are connected using a similar bus 72, and the data transfer between the arithmetic processing clusters 400 and 401 are performed using shared memories 92 and 93 and the like. A hierarchical bus configuration is used in which for the bus 72 between the arithmetic processing clusters 400 and 401, the buses 70 and 71 are masters, and the shared memories 92 and 93 and an external interface Ext. 94 are slaves. The bus access arbiter 300 according to this exemplary embodiment is implemented as an access arbiter of, for example, the bus 70 or the like.

As described above, by including the hierarchical bus configuration that is capable of split transfer, it is possible to improve locality of processing better than in the configuration where all masters and slaves are connected by a single bus, thereby simplifying the bus control circuit and interface circuit. That is, it is possible to prevent wiring in LSI from becoming complicated.

Further, as for transfer latency that deteriorates in the hierarchical bus configuration, by using the bus interface standard capable of split transfer, it is possible to perform transfer without deterioration of the transfer throughput. Furthermore, there is a benefit that easiness of design and reusability is excellent as design and verification can be performed for each of the arithmetic processing clusters 400 and 401.

(Explanation of Specific Operation)

Figure 6:
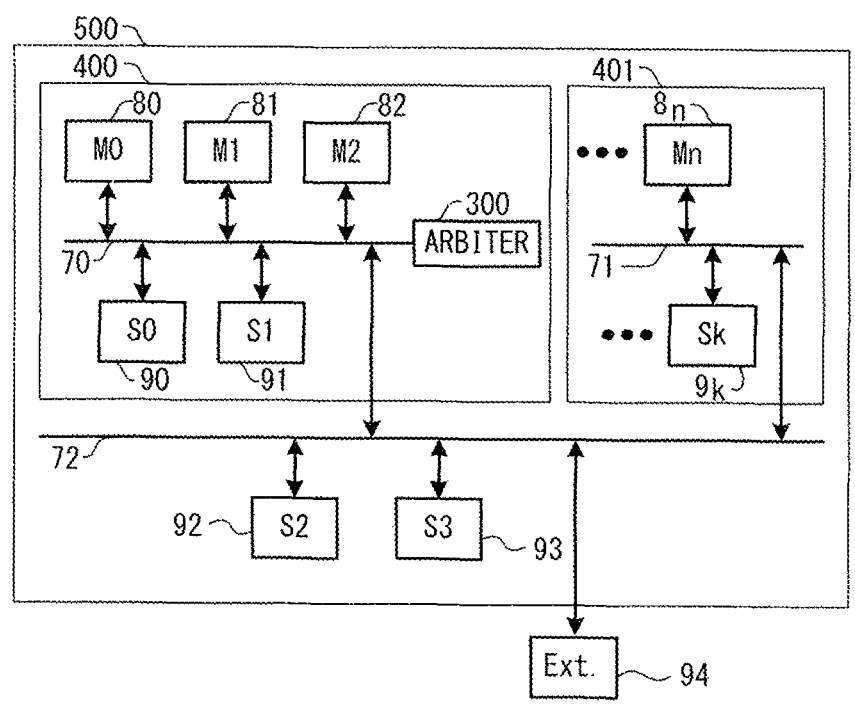
FIG. 6 is a specific block diagram of a multi-processor system including the bus access arbiter according to the first exemplary embodiment.

An operation of a specific example according to this exemplary embodiment shall be explained with reference to FIGS. 6 to 8.

Figure 7:
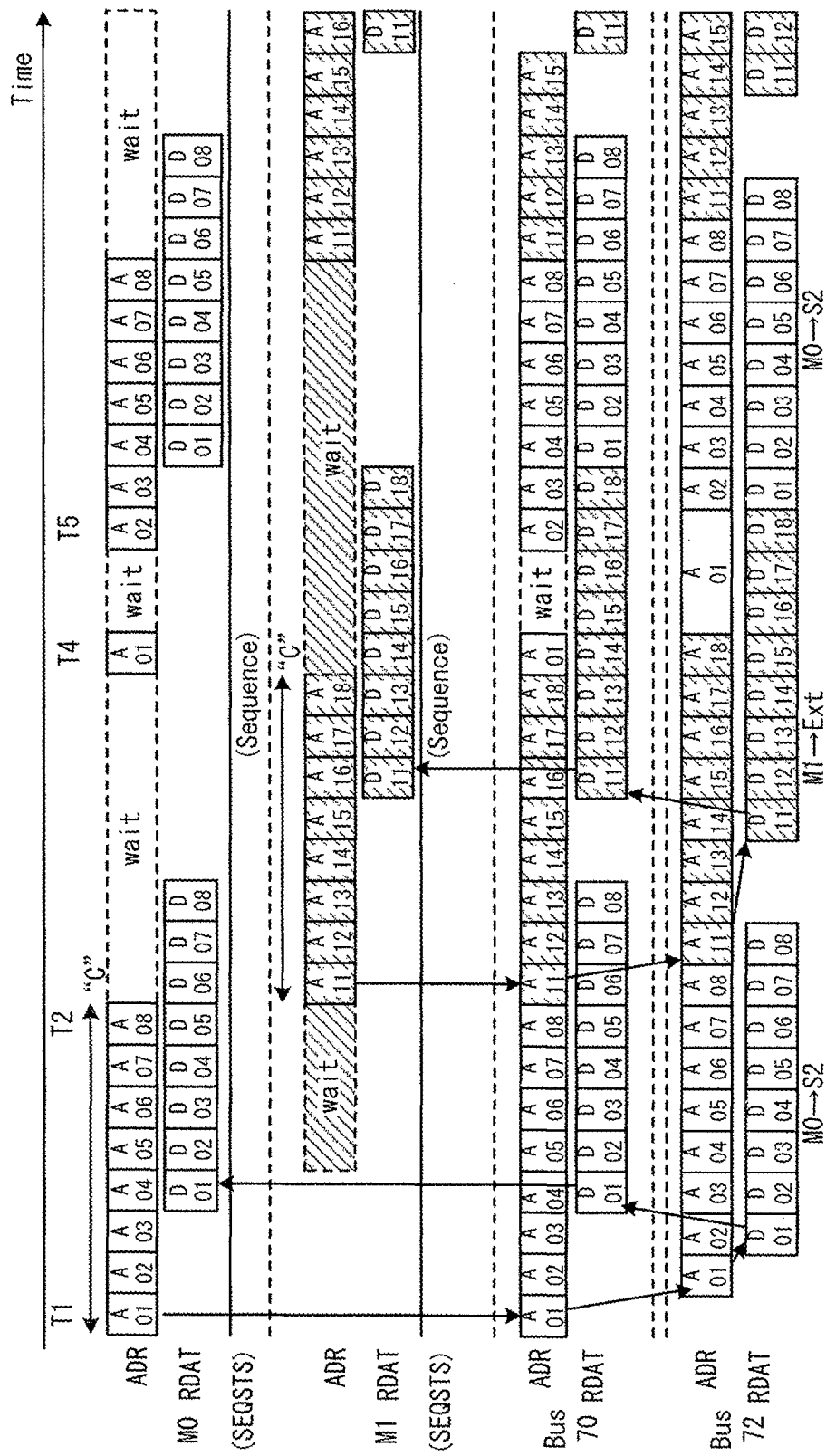
FIG. 7 is a timing chart showing processing timings of a bus access arbitration method according to the first exemplary embodiment.

FIG. 7 is a timing chart showing an example of performing sequential read access on the slave S2 (92), which is the shared memory, from the master M0 (80) and sequential read access on the external interface Ext. (94) from the master M1 (81) in the multi-processor system 500 shown in FIG. 6. Further, for comparison, FIG. 8 is a timing chart showing an example in which the common round robin method is used instead of the bus access arbiter 300 according to this exemplary embodiment as the access arbiter of the bus 70. In both cases, an example in which read latency of the shared memory S2 (92) is one cycle, and read latency of the external interface Ext. (94) is three cycles shall be explained.

As shown in FIG. 7, when the bus access arbiter 300 according to this exemplary embodiment is used and both of the masters M0 and M1 are in the "sequential access mode", the master M0 can sequentially obtain access privileges for "C" times, which is the maximum number of sequential access, for example, from the time T1 to T2. Similarly, the master M1 can sequentially obtain access privileges from the time T3.

Therefore, even when there is sequential access to different slaves (the shared memory S2 (92) and the external interface Ext. (94)) on the bus 72 of the hierarchical subsequent stage, and the access waits in order to prevent conflict of read data and Out-of-Order transfer (near the time T4 to T5), there will be almost no influence, thereby realizing a high transfer throughput. Moreover, in regard to the maximum number of sequential access, as the "C" times, which has been set, can be the maximum, it is possible to guarantee the access latency in a worst case.

That is, in consideration of the access latency in each slave of the subsequent stage, the number of access interval cycles "A" and the numbers of sequential access "B" and "C", which realizes the sequential access, are set to the optimum numbers. By doing so, even for the sequential read access to different slaves in the hierarchical bus configuration, it is possible to both realize a high transfer throughput and guarantee cycles in a worst case.

Figure 8:
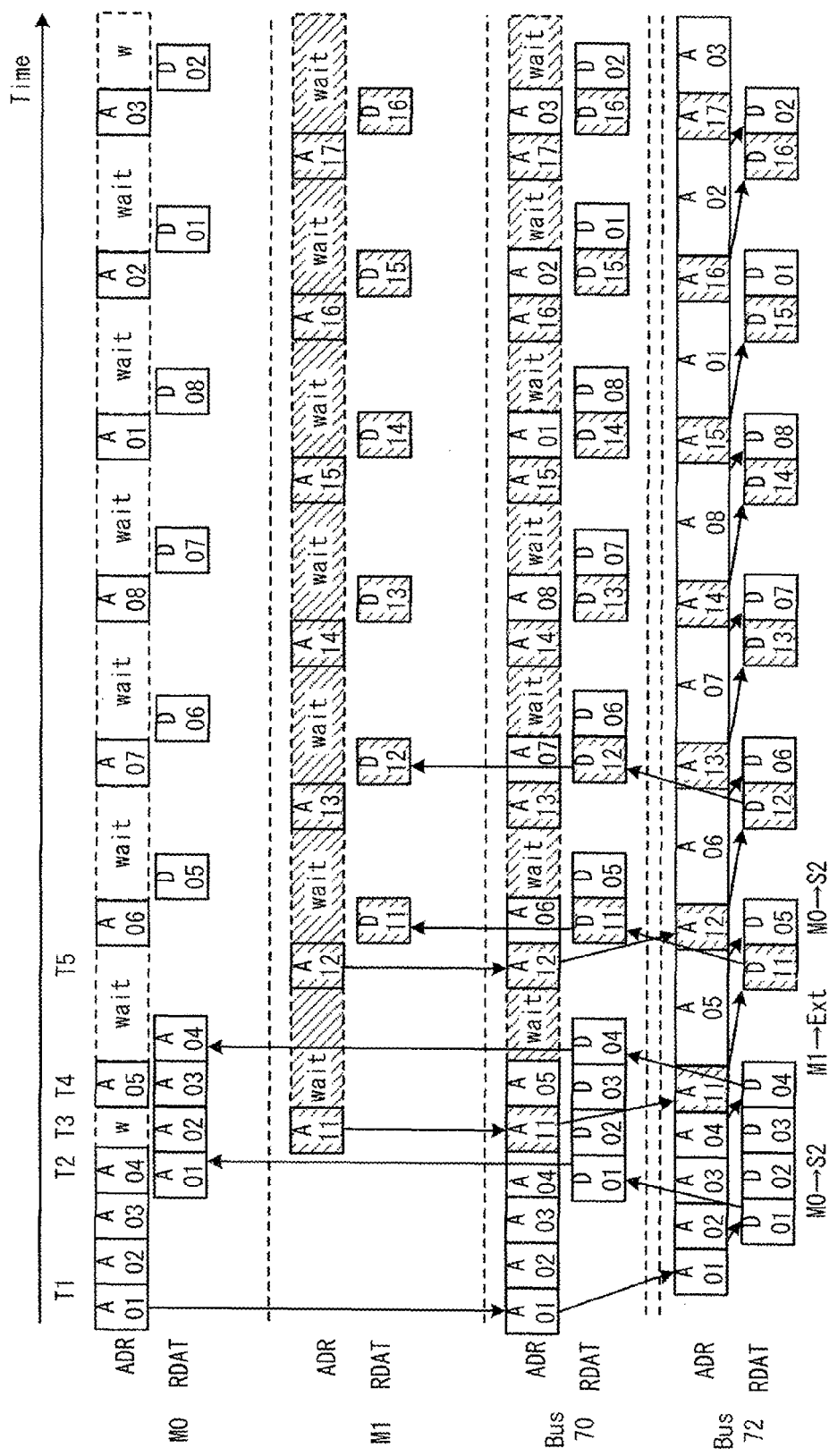
FIG. 8 is a timing chart when the common round-robin method that is used for comparison is employed.

Meanwhile, as shown in FIG. 8, when the common round robin method is used as the access arbitration method of the bus 70, from the time T3 onward, the access privileges are provided alternately to the access from the masters M0 and M1 in the bus 70.

Therefore, the read access to different slaves (the shared memory S2 (92) and the external interface Ext. (94)) on the bus 72 of the hierarchical subsequent stage will be alternate, and in order to prevent conflict of read data and Out-of-Order transfer, wait occurs in every access. In this way, an access throughput of both the masters M0 and M1 largely deteriorates.

As described above, there is a problem that when the access arbitration is performed using the common round robin method in the hierarchical bus configuration capable of split transfer, the access throughput deteriorates. Meanwhile, as shown in FIG. 7, by using the bus access arbiter 300 according to this exemplary embodiment, there is a benefit that it is possible to minimize the deterioration of the access throughput and efficiently perform sequential bus access from a plurality of masters.

Second Exemplary Embodiment of the Invention

In this exemplary embodiment, a modified example of the above-mentioned bus access arbiter according to the first exemplary embodiment shall be explained. This exemplary embodiment explains, in regard to the bus access arbiter, a case in which an access mode judgment unit is included for each of connected masters, so that a judgment of whether the master is in the sequential access mode or the single access mode can be performed more optimally.

(Explanation of Configuration)

Figure 9:
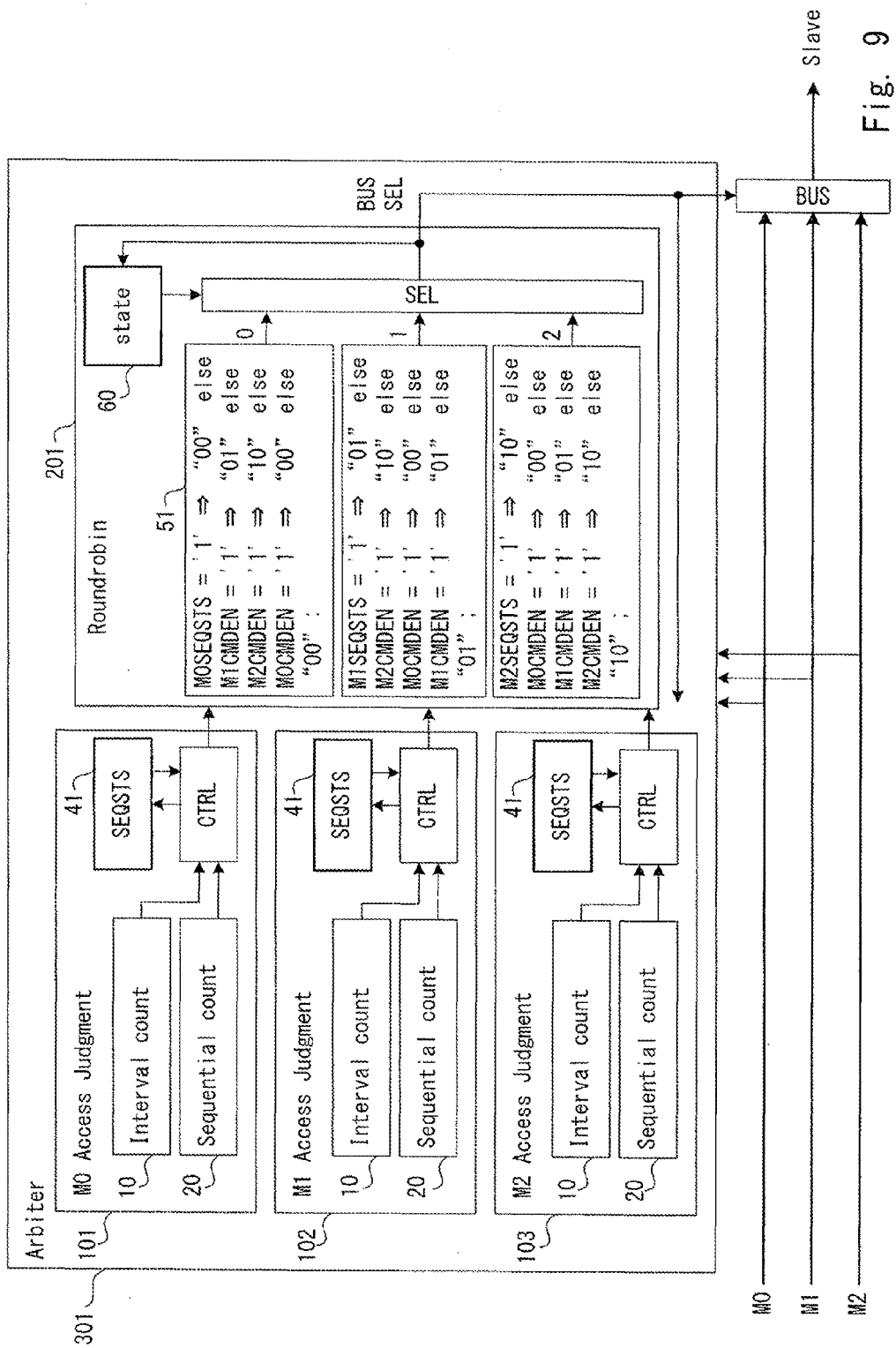
FIG. 9 is an entire block diagram of a bus access arbiter according to a second exemplary embodiment.

FIG. 9 is a diagram showing an entire configuration of a bus access arbiter according to the second exemplary embodiment. In a manner similar to the first exemplary embodiment, a bus access arbiter 301 according to this exemplary embodiment is configured to include access mode judgment units 101, 102, and 103 that judge whether or not each of the masters is in the sequential access mode and a round robin arbitration unit 201 that can dynamically change the access arbitration In a manner similar to the first exemplary embodiment, the round robin arbitration unit 201 includes a round robin control circuit 50 that is supplied with an access mode state signal from each master and switches the access arbitration method based on the said access mode and a round robin state register 60 that stores a last master ID provided with an access privilege as a reference of round robin.

A configuration peculiar to this exemplary embodiment is that the access mode judgment units 101, 102, and 103 are included for the connected masters, respectively. Further, the access mode state register 41 that stores the judged access mode state for each master is also included for each master.

However, the access interval count unit 10 and the sequential access number count unit 20 inside each of the access mode judgment units 101, 102, and 103 have configurations almost same as those in the first exemplary embodiment. Further, as an operation of the round robin control circuit 51 inside the round robin arbitration unit 201 is slightly different from the operation of the round robin control circuit 50 in the first exemplary embodiment, a difference in the operations shall be explained later.

(Explanation of Operation)

Figure 10:
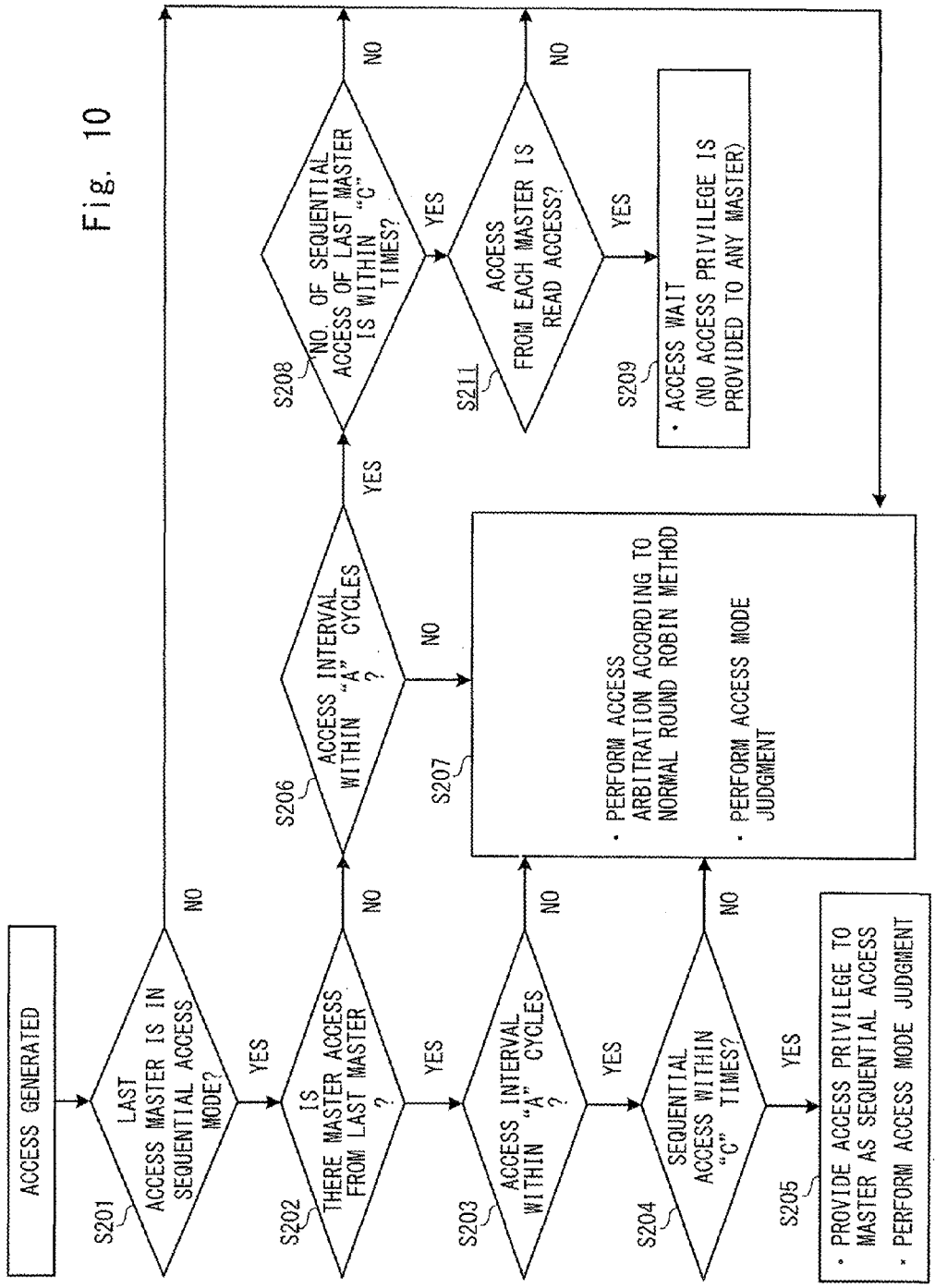
FIG. 10 is a flowchart showing access arbitration processing in the bus access arbiter according to the second exemplary embodiment.
Figure 11:
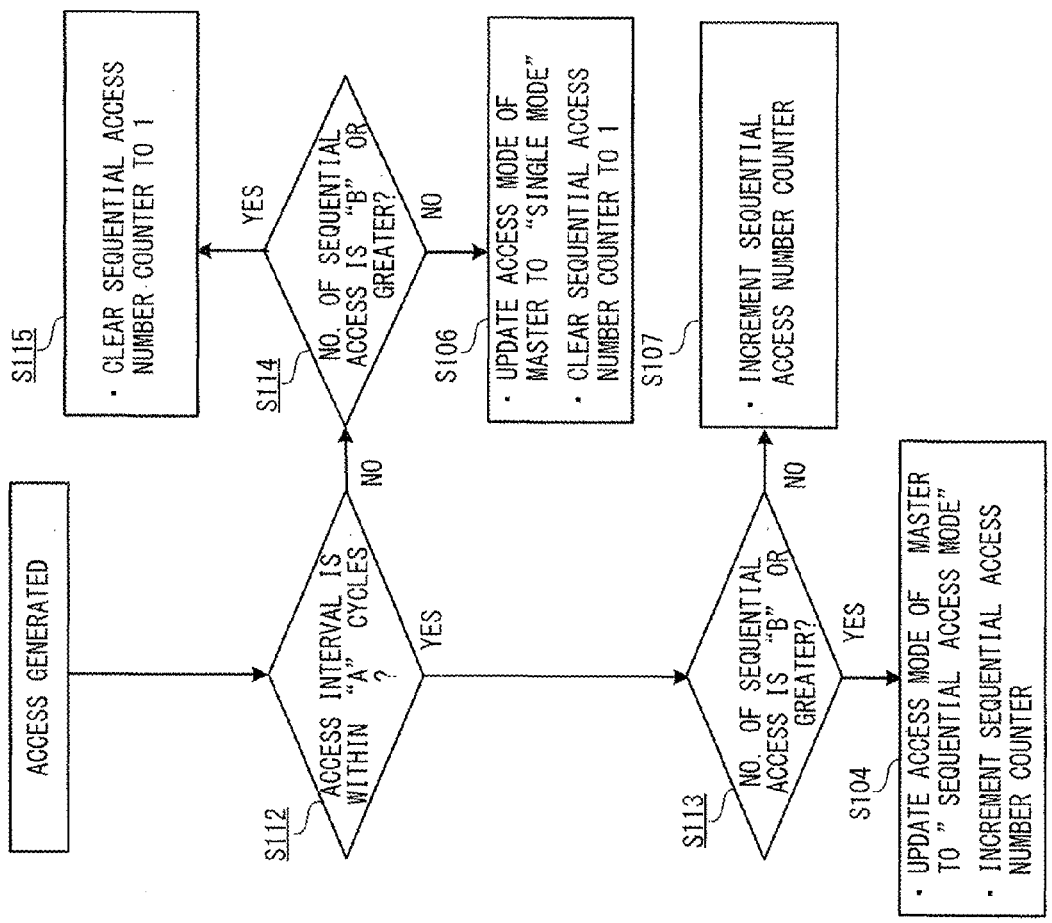
FIG. 11 is a flowchart showing access arbitration processing in the bus access arbiter according to the second exemplary embodiment.

An operation of this exemplary embodiment shall be explained with reference to FIGS. 9 to 11. FIGS. 10 and 11 are flowcharts showing access arbitration processing in the bus access arbiter 301 shown in FIG. 9. In a manner similar to the first exemplary embodiment, the access arbitration processing in this exemplary embodiment is mainly configured to include an access arbitration step shown in FIG. 10 and an access mode judgment step shown in FIG. 11.

However, as an operation peculiar to this exemplary embodiment, the access mode judgment step is performed for each of the connected masters. That is, the access mode judgment processing is performed independently for the respective connected masters using the access mode judgment units 101, 102, and 103. Moreover, the access judgment step in this exemplary embodiment is performed in parallel to the access arbitration step. That is, regardless of whether or not the access is granted, the access mode judgment step is executed at the point when access is generated from the corresponding master.

The access mode judgment step in this exemplary embodiment shown in FIG. 11 is executed at the point when access is generated from each master. That is, the access mode judgment step can be executed in a state where an access privilege is not provided to the said access.

The access mode judgment step in this exemplary embodiment (S112) judges whether or not the access from the said master is an interval within "A" cycles. (S112) When the access interval is within "A" cycles, and (S113) the access becomes the sequential access in which the number of sequential access is "B" or greater, (S104) the access mode of the said master is updated to the "sequential access mode".

Meanwhile, (S112) when the access interval exceeds "A" cycles, the access is not regarded as the sequential access, and (S114) the access mode judgment units 101, 102, and 103 of this exemplary embodiment judge whether or not the number of sequential access is "B" or greater, which is the feature of the access mode judgment units 101, 102, and 103 of this exemplary embodiment.

(S114) When the current number of sequential access is less than "B", the access is judged as not being the sequential access, (S106) the access mode state register 41 of the said master is updated to the "single access mode", and at the same time, the sequential access number counter 23 is cleared to one. Note that when the current number of sequential access is "B" or greater, the access is judged as being in process of the sequential access. Further, (S115) the access mode state register 41 of the said master remains as being the "sequential access mode", and only the value of the sequential access number counter 23 is cleared to one. In Step (S115), the access mode judgment processing can be started again while maintaining the "sequential access mode" state.

Moreover, in a manner similar to the first exemplary embodiment, (S112) when the access interval is within "A" cycles, (S113) and the number of sequential access is less than "B", (S107) the access mode state of the said master is not updated, and only the sequential access number counter 23 is incremented.

In this manner, in the access mode judgment unit 100 of the first exemplary embodiment, the access mode judgment processing for judging whether or not the access is the sequential access is initialized every time the master that is provided with an access privilege changes based on the access arbitration processing result. However, in this exemplary embodiment, the access mode judgment units 101, 102, and 103 are included for the respective masters, and the access mode judgment step can be performed irrespective of the access arbitration result. Thus, there is a benefit in which even when another master obtains the access privilege in the middle, the access judgment processing can be continued independently for each master, thereby enabling more optimal (precise) access mode judgment processing.

Further, the access arbitration step shown in FIG. 10 is basically similar to that in the first exemplary embodiment. However, as an operation peculiar to the access arbitration step in this exemplary embodiment, when access is generated from a master that is not in the process of sequential access, and the access is not the read access (i.e., the access is write access), the round robin control circuit 51 performs an operation different from the operation explained in the first exemplary embodiment.

In the first exemplary embodiment, as shown in FIG. 2, when access is generated from a master different from the master that is in the process of sequential access, the access interval is within "A" cycles, and the number of sequential access of the sequential access master is within "C" (S201→S202→S206→S208), the access is judged as still being "in the process of sequential access", and the access from the different master is made to wait.

Meanwhile, as shown in Step (S211) of FIG. 10, in the access arbitration step of this exemplary embodiment, when access from a different master that is generated under the conditions similar to those explained above is the read access, in consideration of the "sequential access", the access from the different master is made to wait in a manner similar to the first exemplary embodiment. However, when the said access is the write access, there is no influence even when the access is interrupted in the process of "sequential access". Therefore, the access arbitration processing is performed between the said write access by the common round robin method.

As described above, in the bus access arbiter 301 of this exemplary embodiment, the round robin control circuit 51 is configured in such a way that in the case of the write access, the access can be interrupted even in the process of "sequential access". Thus, as compared to the bus access arbiter 300 of the first exemplary embodiment, the access throughput of the bus can be efficiently improved.

Note that the access arbitration step by the round robin control circuit 51 can be applied in both cases when there is one access mode judgment unit 100 as in the first exemplary embodiment and when there are a plurality of access mode judgment units 100 as in this exemplary embodiment. Moreover, conversely, the round robin control circuit 50 and the access arbitration step in the first exemplary embodiment can be applied to the bus access arbiter 301 of this exemplary embodiment.

Third Exemplary Embodiment of the Invention

In this exemplary embodiment, a modified example of the above-mentioned bus access arbiter according to the first and second exemplary embodiments shall be explained. This exemplary embodiment explains, in regard to the bus access arbiter, a case in which the access interval for judging the access as being the sequential access is limited to one cycle (no interval) so as to simplify the circuit configuration.
(Explanation of Configuration)

Figure 12:
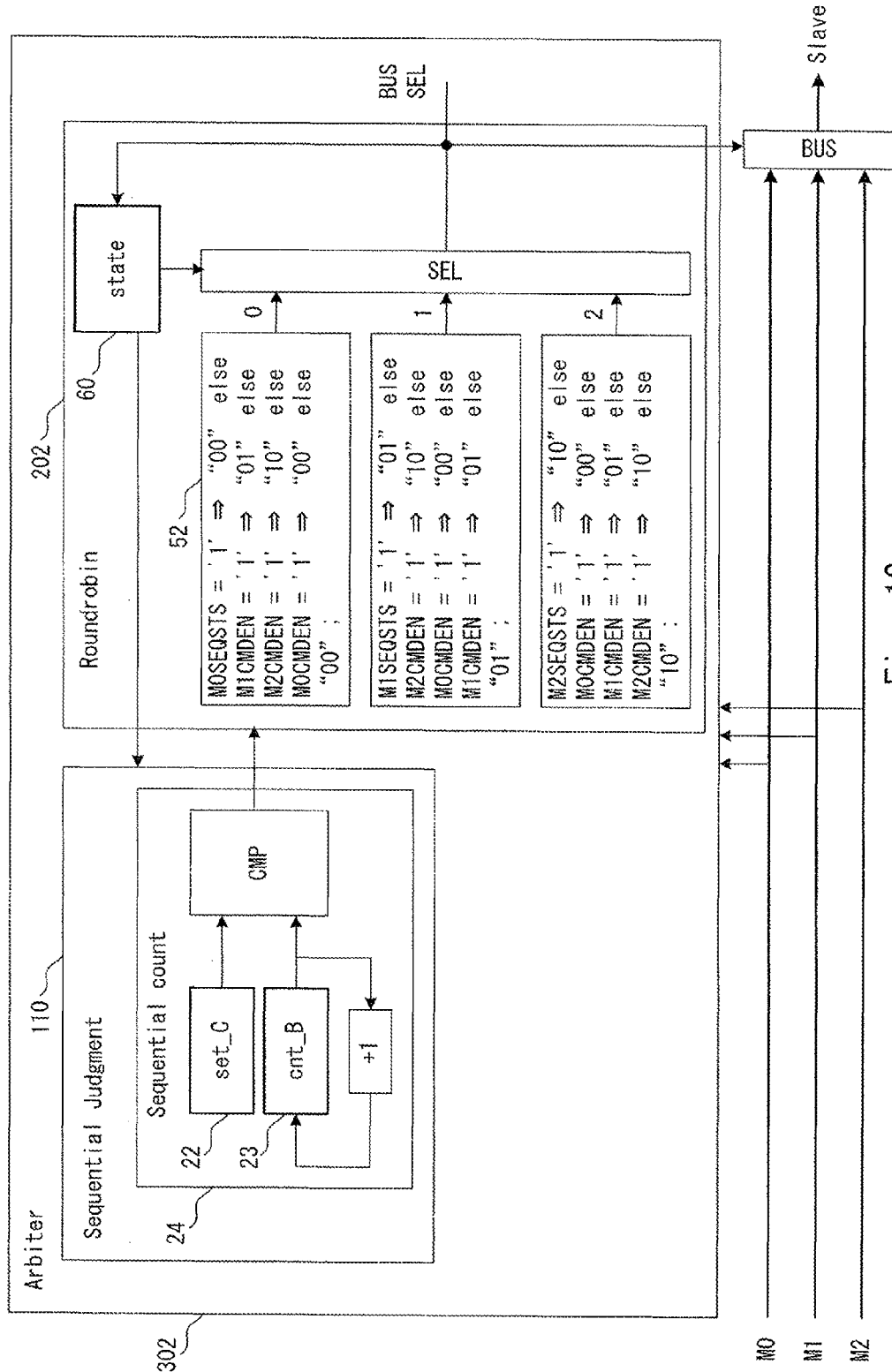
FIG. 12 is an entire block diagram showing a bus access arbiter according to a third exemplary embodiment.

FIG. 12 is a diagram showing an entire configuration of a bus access arbiter according to the third exemplary embodiment. A bus access arbiter 302 according to this exemplary embodiment is configured to include a sequential access number judgment unit 110 that counts the number of sequential access of a master that is currently performing access and compares the counted number with a setting value and a round robin arbitration unit 202 that can dynamically change the access arbitration method according to the judgment result.

The round robin arbitration unit 202 has a configuration similar to that in the first exemplary embodiment and is configured to include a round robin control circuit 52 that is supplied with a sequential access mode signal of a master that is currently performing access and switches the access arbitration method based on the said access mode and a round robin state register 60 that stores the last master ID that is provided with an access privilege as a reference of the round robin.

As a configuration peculiar to this exemplary embodiment, the number of access interval cycles "A" for judging whether or not the access is the sequential access is limited to one cycle (i.e., no interval). Thus, the access interval count unit 10 included in the first and second exemplary embodiments is unnecessary. Similarly, when the number of access interval cycles "A" is limited to one cycle (i.e., no interval), there is no disadvantage in which access needs to wait for an extra access interval even when the access arbitration is performed regarding that the master is in the "sequential access mode" at all times. Accordingly, the access mode state registers 40 and 41 are also unnecessary.

Therefore, only the sequential access number count unit 24 is included as the sequential access number judgment unit 110 and only judges whether or not the number of sequential access is within "C". That is, there is no problem if the sequential access number setting register 21 ("B") for judgment is eliminated.
(Explanation of Operation)

Figure 13:
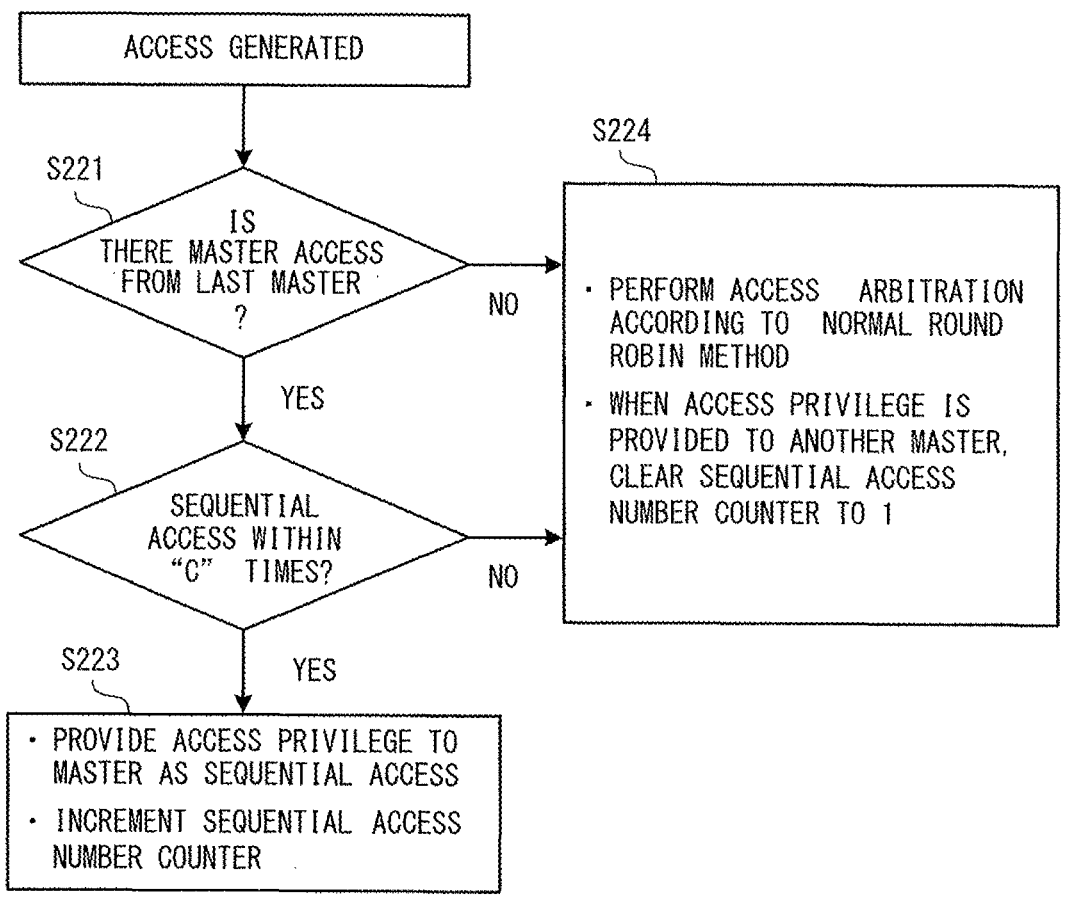
FIG. 13 is a flowchart showing access arbitration processing in the bus access arbiter according to the third exemplary embodiment.

An operation of this exemplary embodiment shall be explained with reference to FIGS. 12 to 13. FIG. 13 is a flowchart showing access arbitration processing in the bus access arbiter 302 shown in FIG. 12. The bus access arbiter 302 of this exemplary embodiment limits the access interval for judging the access as being the sequential access as in the first exemplary embodiment to one cycle (no interval), so that the bus access arbiter 302 operates according to the round robin arbitration method capable of sequential access.

That is, as the number of access interval cycles "A" is limited to one cycle (i.e., no interval), there is no disadvantage in which access needs to wait for an extra access interval even when the access arbitration is performed regarding the master as being in the "sequential access mode" at all times, thereby eliminating the need for the access mode judgment step. Therefore, only the access arbitration step is performed.

In the access arbitration step of this exemplary embodiment, (S221) when there is access from a last master that is provided with the access privilege (i.e., a master indicated by the round robin state register 60 inside the round robin arbitration unit 202), the sequential access number judgment unit 110 counts the number of sequential access. (S222) When the number of sequential access is within "C", which has been set, the master is judged as being in the process of "sequential access", and (S223) the round robin arbitration unit 202 sequentially provides the access privileges to the said master.

Meanwhile, (S221) when the access is not the one from the last master that is provided with the access privilege, or (S222) when the number of sequential access of the last master that performed access exceeds "C", (S224) the access arbitration is performed by the round robin arbitration unit 202 according to the common round robin method. At this time, when the access privilege is provided to a different master, the value of the sequential access number counter 23 is cleared to one.

As described above, this exemplary embodiment has a benefit that the circuit configuration can be greatly simplified because the number of access interval cycles for judging the access as being the sequential access to one cycle (no interval). Further, the first and second exemplary embodiment employ a configuration of including the access mode state registers 40 and 41 that indicate whether each of the masters is in the "single access mode" or the "sequential access mode", in order to solve the problem in which wait for an extra access interval is inserted when the access arbitration is performed at all times in consideration of the "sequential access". In contrast, in this exemplary embodiment, there is a benefit that even when an operation is performed considering that the mode is the "sequential access mode" at all times, it is not necessary to wait for an extra access interval.

Fourth Exemplary Embodiment of the Invention

In this exemplary embodiment, a modified example of the above-mentioned bus access arbiter according to the first and second exemplary embodiments shall be explained. This exemplary embodiment explains, in regard to the bus access arbiter, a case in which the round robin method in consideration of priorities is employed instead of using the common round robin method as the basic access arbitration method, thereby enabling dynamical optimization of the number of access interval cycles and the number of sequential access for access mode judgment.
(Explanation of Configuration)

Figure 14:
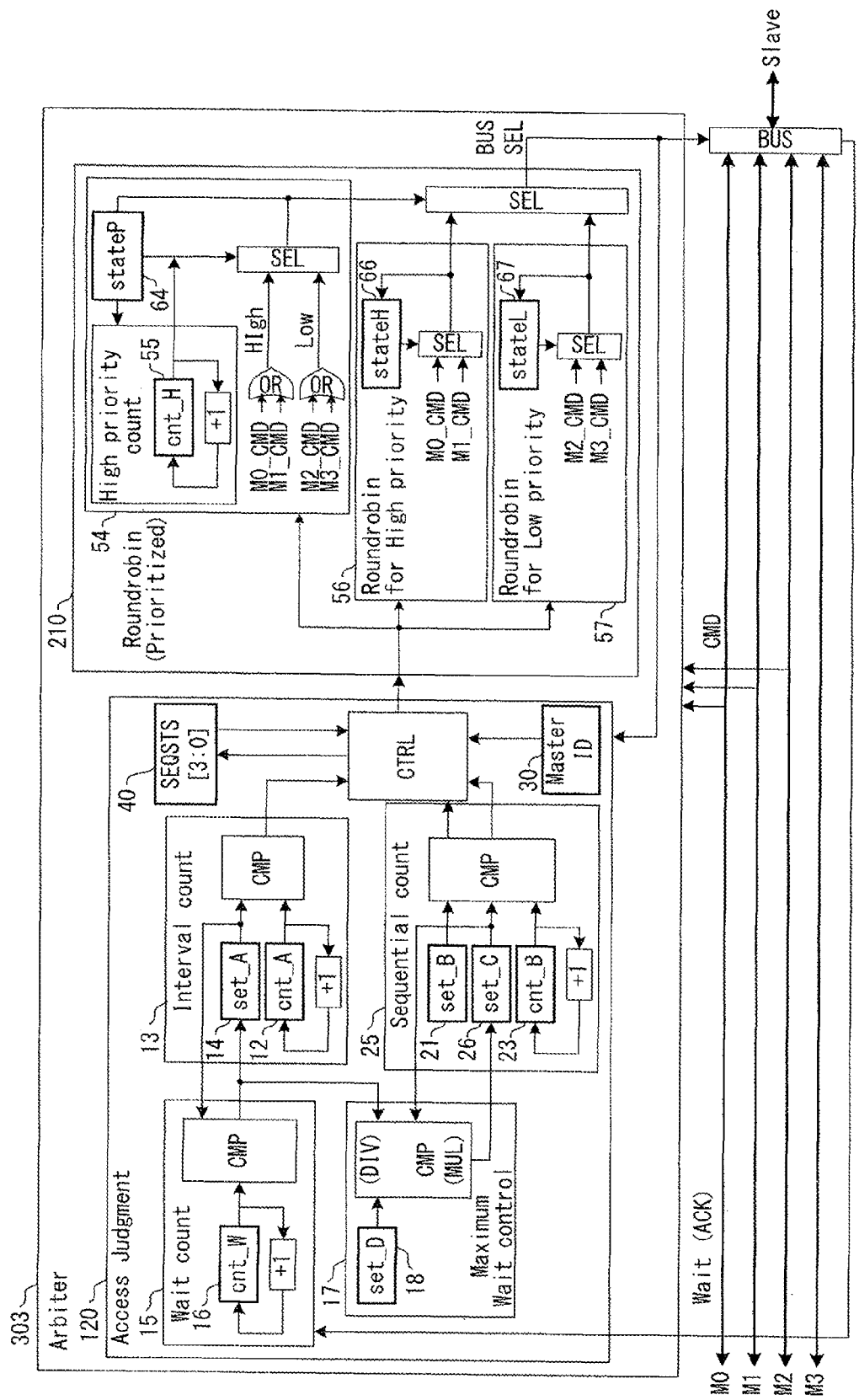
FIG. 14 is an entire block diagram of a bus access arbiter according to a fourth exemplary embodiment.

FIG. 14 is a diagram showing an entire configuration of a bus access arbiter according to a fourth exemplary embodiment. In a manner similar to the first and second exemplary embodiments, a bus access arbiter 303 according to this exemplary embodiment is configured to include an access mode judgment unit 120 that judges whether or not each of the masters is in the sequential access mode and a round robin arbitration unit 210 that can dynamically change the access arbitration method according to the access mode.

In a manner similar to the first exemplary embodiment, the round robin arbitration unit 210 is characterized in that an access mode state signal of each master is supplied and the access arbitration method is switched based on the said access mode. However, as a configuration peculiar to this exemplary embodiment, unlike the common simple round robin control circuit 50, a round robin control circuit with priorities in consideration of priorities is implemented.

That is, the round robin control unit 210 includes an inter-priority round robin control circuit 54 that divides the masters into groups of a high-priority (High) and a low-priority (Low) and firstly performs round robin processing between the said priorities and a high-priority round robin control circuit 56 and a low-priority round robin control circuit 57 that perform the round robin processing in the respective priority groups.

The inter-priority round robin control circuit 54 includes a high-priority number counter 55 that counts the number of sequential access privileges in the high-priority group and an inter-priority round robin state register 64 that stores the last priority group which is provided with the access privilege.

The high-priority round robin control circuit 56 includes a high-priority round robin state register 66 that stores the last master in the high-priority group which is provided with the access privilege. The low-priority round robin control circuit 57 includes a low-priority round robin state register 67 that stores the last master in the low-priority group which is provided with the access privilege. Then, either of the high-priority or the low-priority round robin control circuit operates according to the selection result of the inter-priority round robin control circuit 54.

Further, a basic configuration and operation of the access mode judgment unit 120 of this exemplary embodiment are similar to those of the access mode judgment unit 100 of the first exemplary embodiment. However, as a configuration peculiar to this exemplary embodiment, a wait count unit 15 and a maximum wait control unit 17 are further included inside the access mode judgment unit 120. They only set the maximum acceptable number of wait cycles "D" so as to autonomously update values of the optimum number of access interval cycles "A" and the maximum number of sequential access "C".

Specifically, the wait count unit 15 includes a wait counter 16. For example, when the number of sequential access reaches the maximum number of sequential access in the "sequential access mode" and the access master is switched, the wait counter 16 counts the number of wait cycles in the next access. Then, the counted number is compared with the number of access interval cycles, which is currently set, and the value of "A" is updated as necessary.

Moreover, the maximum wait control unit 17 includes a wait cycle setting register 18 that sets the maximum number of wait cycles "D" that can be accepted by the master. The wait cycle setting register 18 is used to update the value of the maximum number of sequential access "C" using the updated of the number of access interval cycles "A".

Note that configurations of the access interval count unit 13 and the sequential access number count unit 25 are similar to those of the first exemplary embodiment, whereas the access interval setting register 14 and the maximum sequential access number setting register 26 that are included inside have configurations that can be autonomously updated also by the wait count unit 15 or the maximum wait control unit 17.

(Explanation of Operation)

An operation of this exemplary embodiment shall be explained with reference to FIG. 14. In a manner similar to the first exemplary embodiment, the access arbitration processing in this exemplary embodiment is mainly configured to include two steps, which are the access arbitration step and the access mode judgment step shown in FIGS. 2 and 3.

Operations in the access arbitration step are basically similar to those shown in FIG. 2 or 10. However, as an operation peculiar to this exemplary embodiment, in Step (S207) of FIG. 2, when the master is no longer in the sequential access state, the access arbitration processing is performed according to the round robin method in consideration of priorities using the round robin arbitration unit 210 instead of performing the access arbitration processing according to the common round robin method in which all the masters have an equal probability.

That is, when the connected masters are divided into two groups, which are the high-priority (High) and the low-priority (Low) and access conflict is generated, an access privilege is provided to each group according to the round robin with different probabilities, for example as in, "High->High->High->Low->High->High->High->Low->", using the inter-priority round robin control circuit 54. At this time, the number of sequential access privileges which will be provided to the high-priority (High) side is counted using the high-priority number counter 55. In addition, in each of the groups, access privileges are provided according to the common round robin method with an equal probability using the high-priority round robin control circuit 56 and the low-priority round robin control circuit 57.

As described above, it is characterized in that control is performed based on a total of three round robin states, which are the round robin state (stateP) 64 between priorities and the round robin states (stateH and stateL) 66 and 67 in the respective groups. For example, in the configuration illustrated in FIG. 14, the masters M0 and M1 are grouped into the high-priority group, while the masters M2 and M3 are grouped into the low-priority group. When the number of sequential access privileges which will be provided to the high-priority side is two, the masters M0 and M1 can obtain the access privileges with a probability of ⅓, while the masters M2 and M3 can obtain the access privileges with a probability of ⅙. For example, the round robin control will be the control that repeats, for example, "High(M0)->High(M1)->Low(M2)->High(M0)->High(M1)->Low(M3)->".

In this manner, by using the round robin unit 210 of this exemplary embodiment, in the "sequential access mode", access privileges are sequentially provided to a certain master, while when the number of sequential access reaches the maximum number of sequential access or in the "single access mode", the access arbitration is performed according to the round robin method in consideration of priorities. Then, when the access priorities are differentiated between the connected masters, more optimal access arbitration processing can be realized.

Further, in the case of the round robin method in consideration of priorities, unlike the common fixed priority method that cannot guarantee the number of worst access cycles in a worst case, there is a benefit that the number of worst access cycles in a worst case can be guaranteed according to the numbers of masters included in the respective groups, which are the high-priority (High) and the low-priority (Low), and the maximum number of sequential access privileges which will be provided to the high-priority side.

Moreover, the access mode judgment step of this exemplary embodiment is similar to the operation shown in FIG. 3. However, as an operation peculiar to this exemplary embodiment, setting value update processing for autonomously updating a setting value for access mode judgment is performed in parallel to the access mode judgment step using the wait count unit 15 and the maximum wait control unit 17.

Firstly, as an initial setting, the maximum number of wait cycles "D" that can be accepted by the master is set to the wait cycle setting register 18 inside the maximum wait control unit 17. Then, for example when the number of sequential access reaches the maximum number of sequential access in the "sequential access mode" and the access master is switched, at the time of actual bus access, the wait count unit 15 counts the number of wait cycles in the next access using wait signals (Wait) from the bus and the wait counter 16. For example, Wait cycles generated when the access master is switched in a period from the time T4 to T5 of the bus 70 shown in FIG. 7 is counted, or Wait cycles of the bus 70 shown in FIG. 8 that are similar to those of the bus shown in FIG. 7 (e.g., in a period from the time T4 to T5) is counted.

Next, the counted number of Wait cycles is compared with the number of access interval cycles "A" that is currently set, and the value of "A" is updated as necessary. That is, when the number of Wait cycles is greater than the current setting number of access interval cycles "A", an overhead at the time of switching the access master is greater than the wait time in consideration of the "sequential access". Therefore, as the access is judged as being the "sequential access" for a little longer, the value "A" of the access interval setting register 14 is updated in such a manner to increase the number of access interval cycles "A".

Meanwhile, when the number of Wait cycles is less than the current setting number of access interval cycles "A", a wait time overhead in consideration of the "sequential access" is greater than the wait cycle at the time of switching the access master. Therefore, the value "A" of the access interval setting register 14 is updated in such a way to reduce the number of access interval cycles "A" for judging the access as being the "sequential access".

Moreover, at the same time, as a product of the number of access interval cycles "A" and the maximum number of sequential access "C" ("A"×"C") will be the maximum number of wait cycles, the maximum wait control unit 17 updates the value of the maximum number of sequential access "C" in a similar manner to the value "A" of the access interval setting register 14 so that the said maximum number of wait cycles ("A"×"C") will not exceed the maximum number of acceptable wait cycles "D", which has been set. That is, the maximum "C" to achieve ("A"×"C"≤"D") is set. The maximum wait control unit 17 may be realized by, for example, a configuration of a "divider (DIV)" or a "multiplier (MUL)+comparator (CMP)" or a configuration of performing table lookup.

As stated above, there is a benefit in which the access mode judgment unit 120 of this exemplary embodiment can dynamically update the values of the setting number of access interval cycles "A" and the maximum number of sequential access "C" using the wait count unit 15 and the maximum wait control unit 17, so that each of the setting parameters for judging whether or not the master is in the "sequential access mode" state can be dynamically optimized according to a state in the process of an actual bus access operation.

As explained so far, the bus access arbiter according to the present invention judges whether or not the access is the "sequential access" for every access from each of the masters, for example, as the bus access arbiter for the multi-processor system. For example, when access is repeatedly made for "B" or greater times in the interval within "A" cycles, the access is judged as being the "sequential access" state.

Then, it is characterized in that the access arbitration method is dynamically switched from the next access onward according to the judgment result. If the access privilege is obtained in the state of the "sequential access" last time, the access privilege is not provided to other masters during "A" cycles assuming the "sequential access" also in the next time. Meanwhile, when access is made in the state not in the "sequential access" state last time or access is made sequentially for "C" times, which is the maximum number of sequential access, the access arbitration is performed, for example, according to the common round robin method. Then, the access mode judgment processing is continued even during the access arbitration, and the judgment result is updated at all times.

In sum, it is characterized in that the judgment circuit for judging whether the state of each master is the "single access" mode or the "sequential access" mode and the access mode register for storing the judgment result of each master are included, and the access arbitration method is switched according to the current access mode of each master.

Next, effects according to the present invention shall be explained. The bus access arbiter according to the present invention judges whether or not the access is the "sequential access" for every access from each of the masters and dynamically switches the access arbitration method according to the judgment result as the bus access arbiter for the multi-processor system. Thus, it is possible to adaptively realize a high transfer throughput even when single access for control processing and sequential access for data processing from the masters is mixed.

The reason is that when access is made for "B" or greater times in the interval within "A cycles", the access is judged as being the "sequential access" state. In such a case, as the access privilege is not provided to other masters for a certain period of time, sequential access can be possible. Thus, a high transfer throughput can be realized even in a hierarchical bus configuration that uses the bus interface capable of stream access.

Meanwhile, in the "single access" state, which is not the "sequential access" state, the access arbitration is performed according to the common round robin method. This eliminates the need to always wait for a predetermined period assuming the sequential access. Then, the transfer efficiency improves also in this case. In particular, in the multi-processor system that processes stream data such as wireless communication processing, after the "sequential access", it is likely that there will be the "sequential access" next time. Accordingly, judging the access state of the previous access (at the present moment) and switching the next access arbitration method is extremely useful.

(Explanation of Advantageous Effect)

According to the present invention illustrating the above-explained exemplary embodiments as examples, advantageous effects explained below can be expected.

(First Advantageous Effect)

A first advantageous effect is that in the bus access arbiter in the multi-processor system, it is possible to prevent deterioration of an access throughput even in the hierarchical bus configuration using the bus interface capable of stream access.

The reason is that in the bus access arbiter according to the present invention, the said master is judged as being in the "sequential access mode" using the access mode judgment unit, and the access arbitration method is switched, so that it is possible for the said master to make the "sequential access" up to the sequential access of "C" times while the access interval is within "A" cycles. Thus, a high transfer throughput can be realized.

That is, for example, even in the hierarchical bus configuration capable of stream access in which the access throughput deteriorates when the access arbitration is performed according to the common "round robin method" or the like, the present invention switches the access arbitration method oriented for the "sequential access" based on the "sequential access mode" and sequentially provides the access privileges to any master. Therefore, there is a benefit that a high transfer throughput can be realized as shown in the comparison between FIGS. 7 and 8.

Another benefit is that by including a configuration that can switch the access arbitration method using the "single access mode" and the "sequential access mode" in the round robin arbitration unit, even when the single access for control and the sequential access for data processing is generated from the respective master cores at any frequency, the access arbitration method can be switched according to the state, and the transfer throughput will not deteriorate.

In particular, as shown in the specific example of the first exemplary embodiment, when the hierarchical bus configuration is employed, for example, when the master M0 issues read access to the slave S2 and the master M1 issues read access to the slave Ext. sequentially, the access privileges can be sequentially provided based on the sequential access mode. In this manner, it is possible to minimize an access switch overhead for different slaves and prevent deterioration of the transfer throughput.

In addition, as shown in the third exemplary embodiment, by limiting the number of access interval cycles for judging whether or not the master is the "sequential access mode" state to one cycle (no interval), benefits of both the "single access mode" and the "sequential access mode" can be realized using a simple circuit configuration.

That is, in the first and second exemplary embodiments, the access mode state register and the like indicating whether each of the masters is in the "single access mode" or the "sequential access mode" is included, in order to solve the problem in which wait for an extra access interval is inserted in consideration of the "sequential access" at all times. Meanwhile, in the third exemplary embodiment, there is a benefit that a high transfer throughput can be realized by a simple circuit configuration without waiting for an extra access interval even when an operation is performed in the "sequential access mode" at all times.

(Second Advantageous Effect)

A second advantageous effect is that in the bus access arbiter in the multi-processor system, a more optimal access arbitration method can be selected according to the access state.

The reason is that in the bus access arbiter according to the present invention, by including the access mode judgment unit and executing the access mode judgment step, in the case of, for example, data transfer for control where many single access is made, the said master is judged as being in the "single access mode", while in the case of, for example, stream data transfer for data processing where many sequential access is made, the said master is judged as being in the "sequential access mode", and the access arbitration method can be switched according to the judged access mode.

That is, in the present invention, when the said master is in the "sequential access mode", it is likely that there will be sequential access. Thus, access from other masters is made to wait for predetermined access interval cycles. Meanwhile, when the said master is in the "single access mode" and access from other master is made to wait, it is likely that this will cause an overhead conversely. Thus, by using, for example, the common round robin method, it is possible to efficiently provide an access privilege without making other masters wait.

In the second exemplary embodiment, by including the access mode judgment unit for each of the connected masters, the access mode judgment processing can be performed irrespective of the access arbitration result. In this way, there is a benefit that as it is possible to independently perform the access judgment processing continuously even after other masters obtain the access privileges in the middle, more optimal (precise) access mode judgment processing is possible.

Additionally, as shown in the second exemplary embodiment, the round robin arbitration unit is configured in such a manner in which when the access mode is the "sequential access mode", access is made to wait in the case where other masters are read access, while access is granted in the case where the other masters are write access. It is thus possible to realize more efficient bus access arbitration processing.

Further, in the fourth exemplary embodiment, the round robin arbitration unit for switching the access arbitration processing according to the access mode of each master is composed of a round robin control circuit in consideration of priorities, so that in the case of, for example, the "single access mode", a difference can be made in the access priorities between the connected masters, thereby realizing more optimal access arbitration processing according to the state of each master.

Moreover, in the access mode judgment unit of the fourth exemplary embodiment, the values of the setting number of access interval cycles "A" and the maximum number of sequential access "C" can be dynamically updated using the wait count unit and the maximum wait control unit. Thus, it is possible to dynamically optimize a cycle parameter for judging whether or not the master is in the "sequential access mode" state according to the bus access state. That is, there is a benefit that it is possible to judge whether or not the master is in the "sequential access mode" state at a more desirable timing, enabling selection of a more optimal access arbitration method.

(Third Advantageous Effect)

A third advantageous effect is that in the bus access arbiter in the multi-processor system, the maximum number of wait cycles in a worst case can be guaranteed for a certain master.

The reason is that, the bus access arbiter according to the present invention is configured to basically use the "round robin method" in which the master will always be granted for an access privilege after certain cycles that is limited and can be calculated and not the access arbitration method that is difficult to guarantee cycles in a worst case, such as the common "fixed priority method".

That is, in the present invention, in the "single access mode", basically the access arbitration is performed in a manner similar to the common round method, while in the "sequential access mode", the access interval "A" cycles× the number of sequential access "C" will be an upper limit of the said number of sequential access cycles. It is therefore possible to guarantee the worst number of wait cycles in a worst case of other masters.

Further, also in the case of the round robin arbitration unit using the round robin method with priorities of the fourth exemplary embodiment, it is possible to guarantee the worst number of wait cycles in a worst case of a certain master according to the numbers of masters included in the respective groups of the high-priority (High) and the low-priority (Low) and the maximum number of the access privileges which will be sequentially provided to the high-priority side.

Lastly, even in the case in which the access mode judgment unit of the fourth exemplary embodiment dynamically updates the number of access interval cycles "A" and the maximum number of sequential access "C", as the value of the maximum number of sequential access "C" is adjusted based on the maximum number of allowable wait cycles "D", which has been set, it is possible to guarantee the worst number of cycles in a worst case.

Although the first, second, and third advantageous effects have been explained so far, the greatest advantageous effect of the present invention is that three of these advantageous effects can be achieved simultaneously.

Note that the present invention is not limited to the above-mentioned exemplary embodiments, and modifications can be made as appropriate without departing from the scope of the invention. For example, the bus access arbiter explained in the third exemplary embodiment can be incorporated into the bus access arbiter explained in the first exemplary embodiment, and the access arbitration step explained in the third exemplary embodiment can be incorporated into the access arbitration step explained in the first exemplary embodiment. Moreover, the fourth exemplary embodiment can be incorporated into the first exemplary embodiment.

The whole or part of the exemplary embodiments disclosed above can be described as, but not limited to, the following supplementary notes.

(Supplementary Note 1)

A bus access arbiter comprising:

access mode judgment means for judging, when bus access is generated from a plurality of masters, whether an access mode of each of the masters that are connected is a sequential access mode or a single access mode; and a round robin arbitration means for dynamically switching an access arbitration method that arbitrates the bus access according to the access mode, wherein the access mode judgment means comprises:

access interval count means for counting an access interval from the master;

sequential access number count means for counting the number of sequential access from the master; and an access mode state register for storing a state of the judged access mode for each of the masters, and the bus access arbiter updates the state of the access mode based on the access interval and the number of sequential access.

(Supplementary Note 2)

The bus access arbiter according to Supplementary note 1, wherein the round robin arbitration means preferentially provides, according to the access mode of the last master that has been provided with an access privilege, an access privilege to the said master in the sequential access mode, and performs access arbitration processing according to a round robin method in the single access mode.

(Supplementary Note 3)

The bus access arbiter according to Supplementary note 1, wherein the round robin arbitration means, according to the access mode of the last master that has been provided with the access privilege, (a) in the sequential access mode, when access, in which the number of sequential access is within a predetermined number of sequential access while the access interval is within a predetermined interval, is generated from the said master, an access privilege is provided to the said master, (b) in the sequential access mode, when access is not generated from the said master and access is generated from another one of the plurality of masters while the access interval is within the predetermined access interval, the access from the other one of the plurality of masters is made to wait, (c) in the sequential access mode, when the access interval exceeds the predetermined access interval or access is generated from the said master in which the number of sequential access exceeds the predetermined number of sequential access, the access arbitration processing is performed according to the round robin method, and (d) in the single access mode, the access arbitration processing is performed according to the round robin method.

(Supplementary Note 4)

4. The bus access arbiter according to one of Supplementary notes 1 to 3, wherein the access mode judgment means, for the bus access from any of the masters, (a) when the number of sequential access becomes greater than or equal to the predetermined number of sequential access while the access interval is within the predetermined access interval, judges the said master as being in the sequential access mode, and (b) in a state where the number of sequential access has not reached the predetermined number of sequential access, when the access interval exceeds the predetermined access interval, judges the said master as being in the single access mode.

(Supplementary Note 5)

The bus access arbiter according to Supplementary notes 1, 2, 3, or 4, wherein the access interval count means comprises an access interval setting register that sets a predetermined access interval and an access interval counter that counts number of access intervals, the sequential access number count means comprises a sequential access number setting register that sets a predetermined number of sequential access for judgment, a maximum sequential access number setting register that sets a predetermined number of sequential access, and a sequential access number counter that counts the number of sequential access.

(Supplementary Note 6)

The bus access arbiter according to any one of Supplementary notes 1 to 5, wherein the access mode judgment means is included for each of the masters that are connected.

(Supplementary Note 7)

The bus access arbiter according to any one of Supplementary notes 1 to 6, wherein the round robin arbitration means performs access arbitration according to the round robin method when the access from each of the masters is write access even when the access mode is the sequential access mode.

(Supplementary Note 8)

The bus access arbiter according to any one of Supplementary notes 1 to 7, wherein the round robin arbitration means groups the respective masters into different priority groups and employs the round robin method in consideration of the priority as the access arbitration method.

(Supplementary Note 9)

The bus access arbiter according to any one of Supplementary notes 1 to 8, wherein the access mode judgment means comprises:

wait count means for counting the number of wait cycles in next access when, in the sequential access mode, the number of sequential access reaches the predetermined number of sequential access, and the master to perform access is switched; and maximum wait control means for controlling the maximum number of wait cycles that can be allowed by the master, and the access mode judgment means dynamically updates values of setting registers included in the respective access interval count means and the sequential access number count means based on the counted number of wait cycles and the maximum number of wait cycles that can be allowed.

(Supplementary Note 10)

The bus access arbiter according to any one of Supplementary notes 1 to 9, wherein in the access mode state register, a state of the access mode can be set externally, and the round robin arbitration means performs the access arbitration processing according to the set access mode.

(Supplementary Note 11)

A bus access arbiter comprising:

sequential access number judgment means for counting, when bus access is generated from a plurality of masters, the number of sequential access from the last master that has been provided with an access privilege; and round robin arbitration means for dynamically switching an access arbitration method that arbitrates the bus access according to a judgment result by the sequential access number judgment means, wherein the round robin arbitration means (a) when access is generated from the master while the number of sequential access is within a predetermined number of sequential access, preferentially provides an access privilege to the said mater, and (b) when the number of sequential access exceeds the predetermined number of sequential access or no access is generated from the master, access arbitration is performed according to a round robin method.

(Supplementary Note 12)

A bus access arbitration method comprising:

an access mode judgment step for judging, when bus access is generated from a plurality of masters, whether an access mode of each of the master that are connected is a sequential access mode or a single access mode; and a round robin arbitration step for dynamically switching an access arbitration method that arbitrates the bus access according to the judged access mode, wherein in the access mode judgment step, a state of the access mode is updated based on an access interval from the master and the number of sequential access from the master, and the state of the updated access mode is stored to an access mode state register for each of the masters.

(Supplementary Note 13)

A bus access arbitration method comprising:

a sequential access number count step for counting, when bus access is generated from a plurality of masters, the number of sequential access from the last master that has been provided with an access privilege;

an access privilege providing step for preferentially providing, when access is generated from the master while the number of sequential access is within a predetermined number of sequential access, an access privilege to the said mater; and an access arbitration step for performing access arbitration according to a round robin method when the number of counted sequential access exceeds the predetermined number of sequential access or no access is generated from the master.

Although the present invention has been explained with reference to the exemplary embodiments, the present invention is not limited by above. Various modifications, obvious to those skilled in the art, can be made to the configuration and detail of the present invention within the scope of the present invention.

The present application claims priority rights of and is based on Japanese Patent Application No. 2012-81712 filed on Mar. 30, 2012 in the Japanese Patent Office, the entire contents of which are hereby incorporated by reference.

REFERENCE SIGNS LIST 10, 13 ACCESS INTERVAL COUNT UNIT
11, 14 ACCESS INTERVAL SETTING REGISTER
12 ACCESS INTERVAL COUNTER
15 WAIT COUNT UNIT
16 WAIT COUNTER
17 MAXIMUM WAIT CONTROL UNIT
18 WAIT CYCLE SETTING REGISTER
20, 24, 25 SEQUENTIAL ACCESS NUMBER COUNT UNIT
21 SEQUENTIAL ACCESS NUMBER SETTING REGISTER
22, 26 MAXIMUM SEQUENTIAL ACCESS NUMBER SETTING REGISTER
23 SEQUENTIAL ACCESS NUMBER COUNTER
30 MASTER ID REGISTER
40 ACCESS MODE STATE REGISTER
50, 51, 52 ROUND ROBIN CONTROL CIRCUIT
54 INTER-PRIORITY ROUND ROBIN CONTROL CIRCUIT
55 HIGH-PRIORITY NUMBER COUNTER
56 HIGH-PRIORITY ROUND ROBIN CONTROL CIRCUIT
57 LOW-PRIORITY ROUND ROBIN CONTROL CIRCUIT
60 ROUND ROBIN STATE REGISTER
64 INTER-PRIORITY ROUND ROBIN STATE REGISTER
66 HIGH-PRIORITY ROUND ROBIN STATE REGISTER
67 LOW-PRIORITY ROUND ROBIN STATE REGISTER
70, 71, 72 BUS
80 to 8n MASTER BLOCK
90 to 9k SLAVE BLOCK
100, 101, 102, 103, 120 ACCESS MODE JUDGMENT UNIT
110 SEQUENTIAL ACCESS NUMBER JUDGMENT UNIT
200, 201, 202, 210 ROUND ROBIN ARBITRATION UNIT
300, 301, 302, 303 BUS ACCESS ARBITER
400, 401 ARITHMETIC PROCESSING CLUSTER
500 MULTI-PROCESSOR SYSTEM

The invention claimed is:

1. The bus access arbiter, comprising:

access mode judgment unit that judges, when bus access is generated from a plurality of masters, whether an access mode of each of the masters that are connected is a sequential access mode or a single access mode; and a round robin arbitration unit that dynamically switches an access arbitration method that arbitrates the bus access according to the access mode, wherein the access mode judgment unit comprises:
  access interval count unit that counts an access interval from the master;
  sequential access number count unit that counts the number of sequential access from the master; and
  an access mode state register that stores a state of the judged access mode for each of the masters, and wherein
  the round robin arbitration unit, according to the access mode of the last master that has been provided with the access privilege,
  (a) in the sequential access mode, when access, in which the number of sequential access is within a predetermined number of sequential access while the access interval is within a predetermined interval, is generated from the said master, an access privilege is provided to the said master,
  (b) in the sequential access mode, when access is not generated from the said master and access is generated from another one of the plurality of masters while the access interval is within the predetermined access interval, the access from the other one of the plurality of masters is made to wait,
  (c) in the sequential access mode, when the access interval exceeds the predetermined access interval or access is generated from the said master in which the number of sequential access exceeds the predetermined number of sequential access, the access arbitration processing is performed according to the round robin method, and
  (d) in the single access mode, the access arbitration processing is performed according to the round robin method.

2. The bus access arbiter according to claim 1 wherein the access interval count unit comprises an access interval setting register that sets a predetermined access interval and an access interval counter that counts number of access intervals,
the sequential access number count unit comprises a sequential access number setting register that sets a predetermined number of sequential access for judgment, a maximum sequential access number setting register that sets a predetermined number of sequential access, and a sequential access number counter that counts the number of sequential access.

3. The bus access arbiter according to claim 1, wherein the round robin arbitration unit performs access arbitration according to the round robin method when the access from each of the masters is write access even when the access mode is the sequential access mode.

4. The bus access arbiter according to claim 1, wherein the round robin arbitration unit groups the respective masters into different priority groups and employs the round robin method in consideration of the priority as the access arbitration method.

5. The bus access arbiter according to claim 1, wherein in the access mode state register, a state of the access mode can be set externally, and
the round robin arbitration unit performs the access arbitration processing according to the set access mode.

6. The bus access arbiter, comprising:
access mode judgment unit that judges, when bus access is generated from a plurality of masters, whether an access mode of each of the masters that are connected is a sequential access mode or a single access mode; and
a round robin arbitration unit that dynamically switches an access arbitration method that arbitrates the bus access according to the access mode,
wherein the access mode judgment unit comprises:
  access interval count unit that counts an access interval from the master;
  sequential access number count unit that counts the number of sequential access from the master; and
  an access mode state register that stores a state of the judged access mode for each of the masters, and
wherein
  (a) when the number of sequential access becomes greater than or equal to the predetermined number of sequential access while the access interval is within the predetermined access interval, updates the state of the access mode of the said master as being in the sequential access mode, and
  (b) in a state where the number of sequential access has not reached the predetermined number of sequential access, when the access interval exceeds the predetermined access interval, updates the state of the access mode of the said master as being in the single access mode.

7. The bus access arbiter according to claim 6, wherein the access mode judgment unit is included for each of the masters that are connected.

8. The bus access arbiter according to claim 6, wherein the access mode judgment unit comprises:
  wait count unit that counts the number of wait cycles in next access when, in the sequential access mode, the number of sequential access reaches the predetermined number of sequential access, and the master to perform access is switched; and
  maximum wait control unit that controls the maximum number of wait cycles that can be allowed by the master, and
the access mode judgment unit dynamically updates values of setting registers included in the respective access interval count unit and the sequential access number count unit based on the counted number of wait cycles and the maximum number of wait cycles that can be allowed.

9. A bus access arbitration method comprising:
an access mode judgment step for judging, when bus access is generated from a plurality of masters, whether an access mode of each of the master that are connected is a sequential access mode or a single access mode; and
a round robin arbitration step for dynamically switching an access arbitration method that arbitrates the bus access according to the judged access mode,
wherein
  in the access mode judgment step,
  a state of the access mode is updated based on an access interval from the master and the number of sequential access from the master, and the state of the updated access mode is stored to an access mode state register for each of the masters,
for the bus access from any of the masters,
  (a) when the number of sequential access becomes greater than or equal to the predetermined number of sequential access while the access interval is within the predetermined access interval, updates the state of the access mode of the said master as being in the sequential access mode, and (b) in a state where the number of sequential access has not reached the predetermined number of sequential access, when the access interval exceeds the predetermined access interval, updates the state of the access mode of the said master as being in the single access mode.

* * * * *